(12) United States Patent
Momchilov

(10) Patent No.: US 11,693,674 B2
(45) Date of Patent: *Jul. 4, 2023

(54) PROVIDING USER INTERFACE (UI) ELEMENTS HAVING AN ORDERED HIERARCHY OF GRAPHICAL CONTROL ELEMENTS IN VIRTUAL MACHINE SESSIONS AT REDUCED LATENCY AND RELATED METHODS

(71) Applicant: CITRIX SYSTEMS, INC., Fort Lauderdale, FL (US)

(72) Inventor: Georgy Momchilov, Parkland, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 24 days.

This patent is subject to a terminal disclaimer.

(21) Appl. No.: 17/643,882

(22) Filed: Dec. 13, 2021

(65) Prior Publication Data
US 2022/0100538 A1 Mar. 31, 2022

Related U.S. Application Data

(63) Continuation of application No. 16/365,773, filed on Mar. 27, 2019, now Pat. No. 11,281,478.

(51) Int. Cl.
G06F 9/451 (2018.01)
G06F 16/957 (2019.01)
G06F 3/0481 (2022.01)
G06F 9/455 (2018.01)

(52) U.S. Cl.
CPC .......... *G06F 9/451* (2018.02); *G06F 3/0481* (2013.01); *G06F 9/45558* (2013.01); *G06F 16/9574* (2019.01); *G06F 2009/45595* (2013.01)

(58) Field of Classification Search
None
See application file for complete search history.

(56) References Cited

U.S. PATENT DOCUMENTS

| | | |
|---|---|---|
| 6,538,667 B1 | 3/2003 | Duursma et al. |
| 9,176,744 B2 | 11/2015 | Lee |
| 9,538,345 B2 | 1/2017 | Sah et al. |
| 9,588,637 B2 | 3/2017 | Momchilov et al. |
| 9,641,599 B2 | 5/2017 | Wesley et al. |
| 9,826,019 B2 | 11/2017 | Kumar |
| 9,870,192 B2 | 1/2018 | Petrov |
| 9,871,740 B2 | 1/2018 | Parthasarathy et al. |
| 9,936,040 B2 | 4/2018 | Dakhane et al. |
| 9,979,653 B2 | 5/2018 | Testicioglu et al. |

(Continued)

*Primary Examiner* — Matthew Ell
*Assistant Examiner* — David V Luu

(57) ABSTRACT

A computing system includes a virtualization server that runs virtual machine sessions and provides a hosted application with user interface (UI) elements having an ordered hierarchy of graphical control elements when sequenced therethrough. A client computing device accesses the hosted application and receives the ordered hierarchy of graphical control elements and displays the graphical control elements as local virtual UI elements, applies user input to one of the graphical control elements in focus, generates a local virtual UI element graphics overlay for display corresponding to a predicted response to the user input as a next graphical control element in the ordered hierarchy and sends the user input to the virtualization server.

20 Claims, 23 Drawing Sheets

(56) References Cited

U.S. PATENT DOCUMENTS

| | | |
|---|---|---|
| 9,990,170 B2 | 6/2018 | Kumar et al. |
| 10,015,543 B1 | 7/2018 | Peterkofsky et al. |
| 10,114,517 B2 | 10/2018 | Kumar |
| 10,114,600 B2 | 10/2018 | Petrov |
| 10,116,521 B2 | 10/2018 | Kokkula et al. |
| 10,127,062 B2 | 11/2018 | Baboval |
| 10,747,755 B2 | 8/2020 | Bae |
| 11,036,525 B2 | 6/2021 | Momchilov |
| 2005/0273758 A1 | 12/2005 | Long |
| 2009/0288035 A1 | 11/2009 | Tunning et al. |
| 2009/0292984 A1 | 11/2009 | Bauchot et al. |
| 2013/0123004 A1 | 5/2013 | Kruglick |
| 2014/0013234 A1 | 1/2014 | Beveridge et al. |
| 2015/0222660 A1 | 8/2015 | Li et al. |
| 2017/0336883 A1 | 11/2017 | Pavlou et al. |
| 2017/0336884 A1 | 11/2017 | Pavlou et al. |
| 2017/0359282 A1 | 12/2017 | Alsina et al. |
| 2018/0285337 A1 | 10/2018 | Wagh et al. |
| 2018/0307735 A1* | 10/2018 | Thayer ................. G06F 16/211 |
| 2018/0373403 A1 | 12/2018 | Uemura |
| 2019/0184284 A1 | 6/2019 | Quere et al. |
| 2019/0303298 A1 | 10/2019 | Mannby |
| 2019/0391839 A1* | 12/2019 | Ryu .................... G06F 9/45558 |
| 2020/0250372 A1 | 8/2020 | Remington et al. |
| 2020/0310834 A1 | 10/2020 | Momchilov |
| 2020/0310835 A1 | 10/2020 | Momchilov |
| 2020/0310836 A1 | 10/2020 | Momchilov |
| 2022/0012070 A1* | 1/2022 | Azulay ............... G06F 16/9574 |

* cited by examiner

FIG. 15

TABLE: ¶

| HEADER-0¤ | HEADER1¤ | HEADER2¤ | HEADER3¤ |
|---|---|---|---|
| 0,1¤ (614) | 1,1¤ | 2,1¤ | 3,1¤ |
| 0,2¤ | 1,2¤ | 2,2¤ | 3,2¤ |
| 0,3¤ | 1,3¤ | 2,3¤ | 3,3¤ |

PROVIDING USER INTERFACE (UI) ELEMENTS HAVING AN ORDERED HIERARCHY OF GRAPHICAL CONTROL ELEMENTS IN VIRTUAL MACHINE SESSIONS AT REDUCED LATENCY AND RELATED METHODS

PRIORITY APPLICATION(S)

This is a continuation application based upon U.S. patent application Ser. No. 16/365,773 filed Mar. 27, 2019, the disclosure which is hereby incorporated by reference in its entirety.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users.

In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

As more workloads are migrated into these cloud systems and data centers are consolidated across continents, however, the network conditions between the workloads and the endpoints at the client computing devices become more challenging and are characterized with much higher latency and packet loss. This creates a poor user experience (UX) since a time lag appears to the user, especially when navigating user interface (UI) elements in response to different user input such as scrolling or tabbing.

SUMMARY

A computing system includes a virtualization server configured to run virtual machine sessions and provide a hosted application during the virtual machine sessions. The hosted application includes user interface (UI) elements having an ordered hierarchy of graphical control elements when sequenced therethrough. At least one client computing device is configured to access the hosted application during one of the virtual machine sessions with the virtualization server so as to receive the ordered hierarchy of graphical control elements. The at least one computing device is configured to perform the following: display the ordered hierarchy of graphical control elements as local virtual UI elements, apply user input to one of the graphical control elements in focus, generate a local virtual UI element graphics overlay for display corresponding to a predicted response to the user input, with the predicted response corresponding to a next graphical control element in the ordered hierarchy after the graphical control element receiving the user input, and send the user input to the virtualization server.

The virtualization server is configured to apply the received user input to the hosted application, generate an updated UI element graphics corresponding to an actual response to the user input, with the actual response corresponding to the next graphical control element in the ordered hierarchy after the graphical control element receiving the user input, and send the updated UI element graphics to said at least one client computing device.

The at least one client computing device may be configured to replace at least a portion of the local virtual UI element graphics overlay with the received updated UI element graphics, which in an example may be performed by hiding the said local virtual UI element graphics overlay and unveiling the said received updated UI element graphics underneath the said local virtual UI element graphics overlay. Replacing at least a portion of the local virtual UI element graphics overlay with the received updated UI element graphics may be based on an estimated latency between the virtualization server and the at least one client computing device, including in an example at least one of an average, a median and a standard deviation of latencies between the virtualization server and said at least one client computing device.

The at least one client computing device includes an input device, with the user input being based on at least one of a user selecting tab, button, menu, jump list, toggle and picker control via the input device. The next graphical control element in the ordered hierarchy after the graphical control element receiving the user input may be displayed as a highlighted rectangle on the at least one client computing device, for example, based on at least one of a border and color.

Each graphical control element has data associated therewith, with the data being cached by the at least one client computing device. The caching by the at least one client computing device may be performed when the corresponding graphical control element is in focus. The cached data may include encrypted text and may include at least one of a list item, picker control item, menu item, jump list item, and start menu item. The local virtual UI element graphics overlay may be deleted based on one or more of replacing the said local virtual UI element graphics overlay with the received updated UI element graphics, hosted application process terminating, hosted application window closing, hosted application UI element getting out of focus, hosted application UI element becoming hidden, hosted application UI element being deleted, heuristics specific to receiving the hosted application UI element, and policies associated with displaying the received hosted application UI element.

Another aspect is directed to a method for operating virtual machine sessions provided by a virtualization server in communication with at least one client computing device of a computing system to provide a hosted application that includes user interface (UI) elements as an ordered hierarchy of graphical control elements when sequenced therethrough. The method includes accessing the hosted application from at least one client computing device during one of the virtual machine sessions for receiving the ordered hierarchy of graphical control elements, and with the client computing device operable for displaying the ordered hierarchy of graphical control elements as local virtual UI elements, applying user input to one of the graphical control elements in focus, generating a local virtual UI element graphics overlay for display corresponding to a predicted response to the user input, with the predicted response corresponding to a next graphical control element in the ordered hierarchy after the graphical control element receiving the user input, and sending the user input to the virtualization server.

Yet another aspect is directed to a non-transitory computer readable medium for operating virtual machine sessions provided by a virtualization server in communication with at least one client computing device and providing a hosted application that includes user interface (UI) elements as an ordered hierarchy of graphical control elements when sequenced therethrough. The non-transitory computer readable medium has a plurality of computer executable instructions for causing the client computing device to perform steps as described above.

DESCRIPTION OF THE DRAWINGS

FIG. 15 is yet another example screenshot similar that of FIGS. 13 and 14, but with an example Microsoft Excel program.

FIG. 20 is a diagram of text having an embedded table and image as an example for navigating in a table for reduced latency navigation of UI elements.

DETAILED DESCRIPTION

Figure 1:
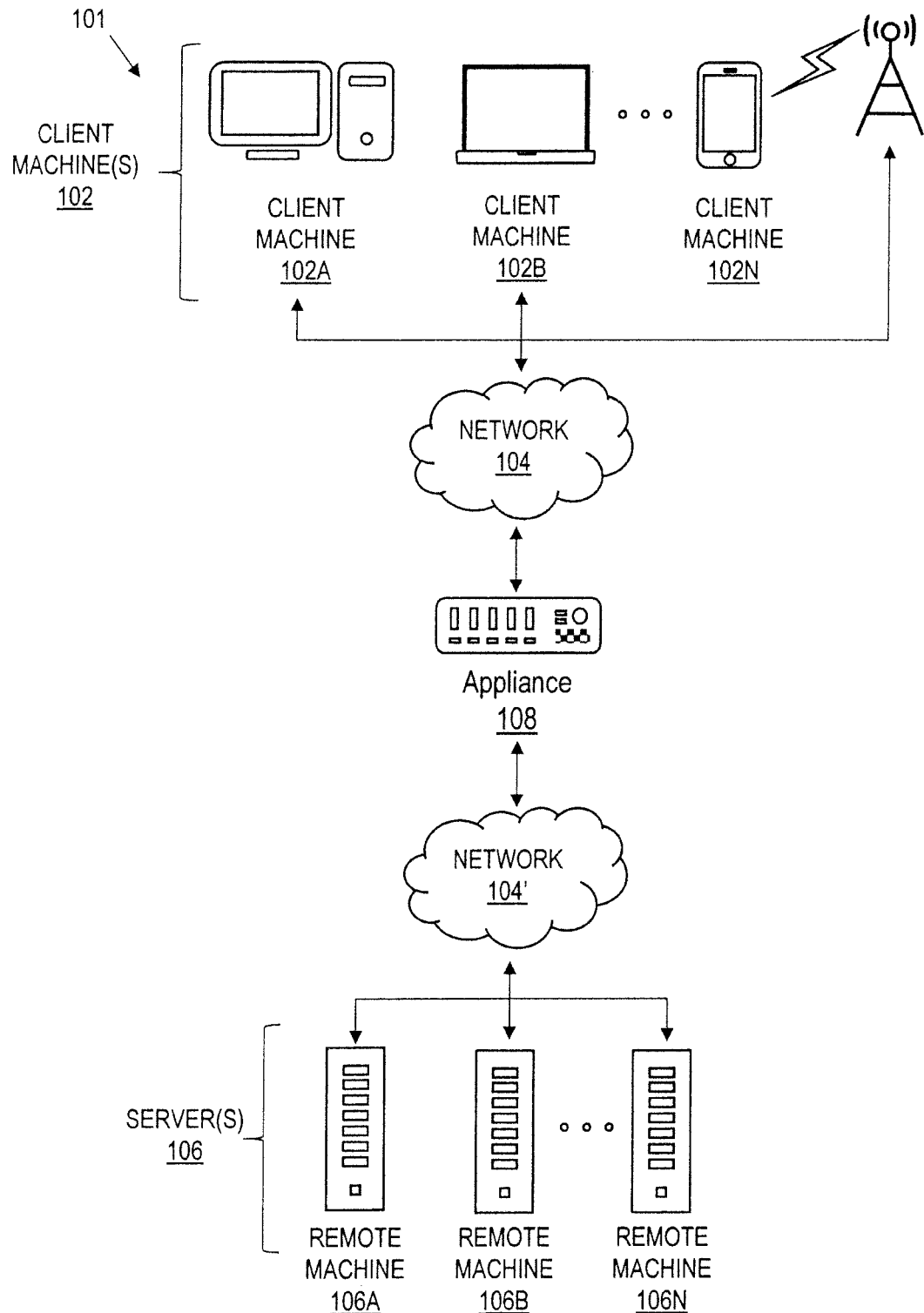
FIG. 1 is a block diagram of a network environment of computing devices in which various aspects of the disclosure may be implemented.

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be discussed in greater detail below, the computing system has three different aspects and provides for reduced latency User Interface (UI) element navigation in virtual applications. Because the latency reduction in effect is substantial, it may appear to the user as a zero latency navigation of UI elements when tabbing, scrolling and performing other similar functions. These three major aspects are generally described, followed by a more detailed analysis.

In a first aspect, a hosted application on a virtualization server includes user interface (UI) elements. A client computing device accesses the hosted application during a virtual machine session, receives the UI elements, and displays the UI elements as local hidden virtual UI elements. User input is applied to a local virtual UI element in focus and a local visible virtual UI element graphics overlay is generated corresponding to a predicted response to user input. User input is sent to the virtualization server, which in turn, generates updated UI element graphics corresponding to an actual response to the user input. Those updated UI element graphics are sent to the client computing device, which replaces at least a portion of the local visible virtual UI element graphics overlay corresponding to the predicted response.

In a second aspect, the hosted application may include UI elements having scrollable content. The client computing device may not only display at least a portion of the scrollable content but may also create corresponding local hidden virtual UI elements. The client computing device may also apply user input to scroll a portion of the scrollable content in focus and cache scrollable content that is positioned adjacent to the portion of the scrollable content being scrolled that is not in focus and generate the local visible virtual UI element graphics overlay that includes at least a portion of the cached scrollable content for display corresponding to a predicted response to the user input. The virtualization server may generate updated UI element graphics that include at least a portion of the cached scrollable content corresponding to an actual response to the user input and send the updated UI element graphics to the client computing device.

In a third aspect, the UI elements are in an ordered hierarchy of graphical control elements when sequenced therethrough such as when a user selects a tab, button, menu, jump list, toggle, and picker control via an input device. A UI element in focus may be highlighted, e.g., as a rectangle. A UI element may include data being cached by the at least one client computing device. The caching by the at least one client computing device may be performed when the corresponding graphical control element is in focus. In other embodiments the caching by the at least one client computing device may be performed even when the corresponding graphical control element is not in focus.

Figure 3:
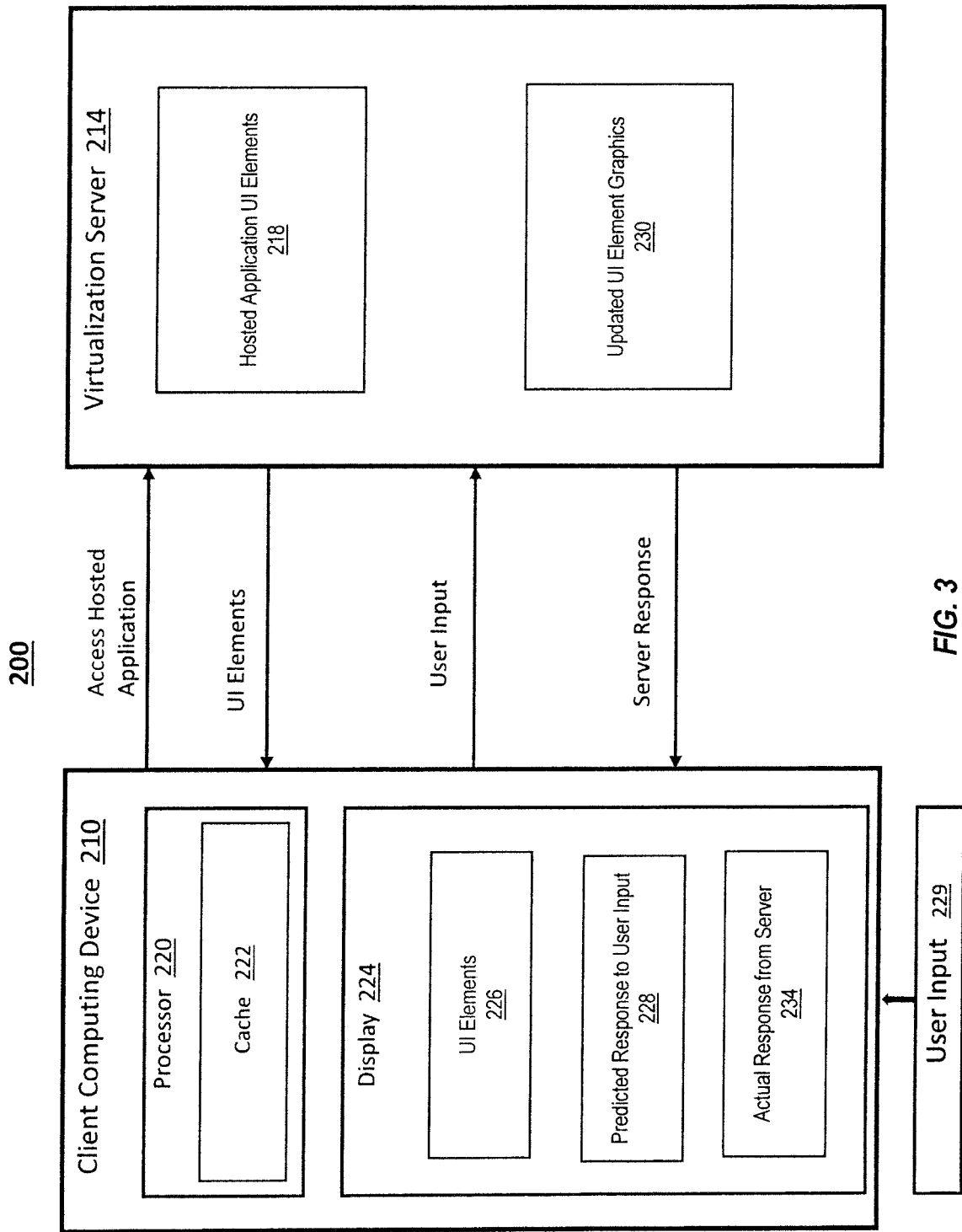
FIG. 3 is block diagram of a computing system for reduced latency navigation of UI elements in a first aspect that includes a client computing device that displays user interface (UI) elements as a predicted response to user input and a virtualization server that provides updated UI element graphics for the actual response to user input.
Figure 4:
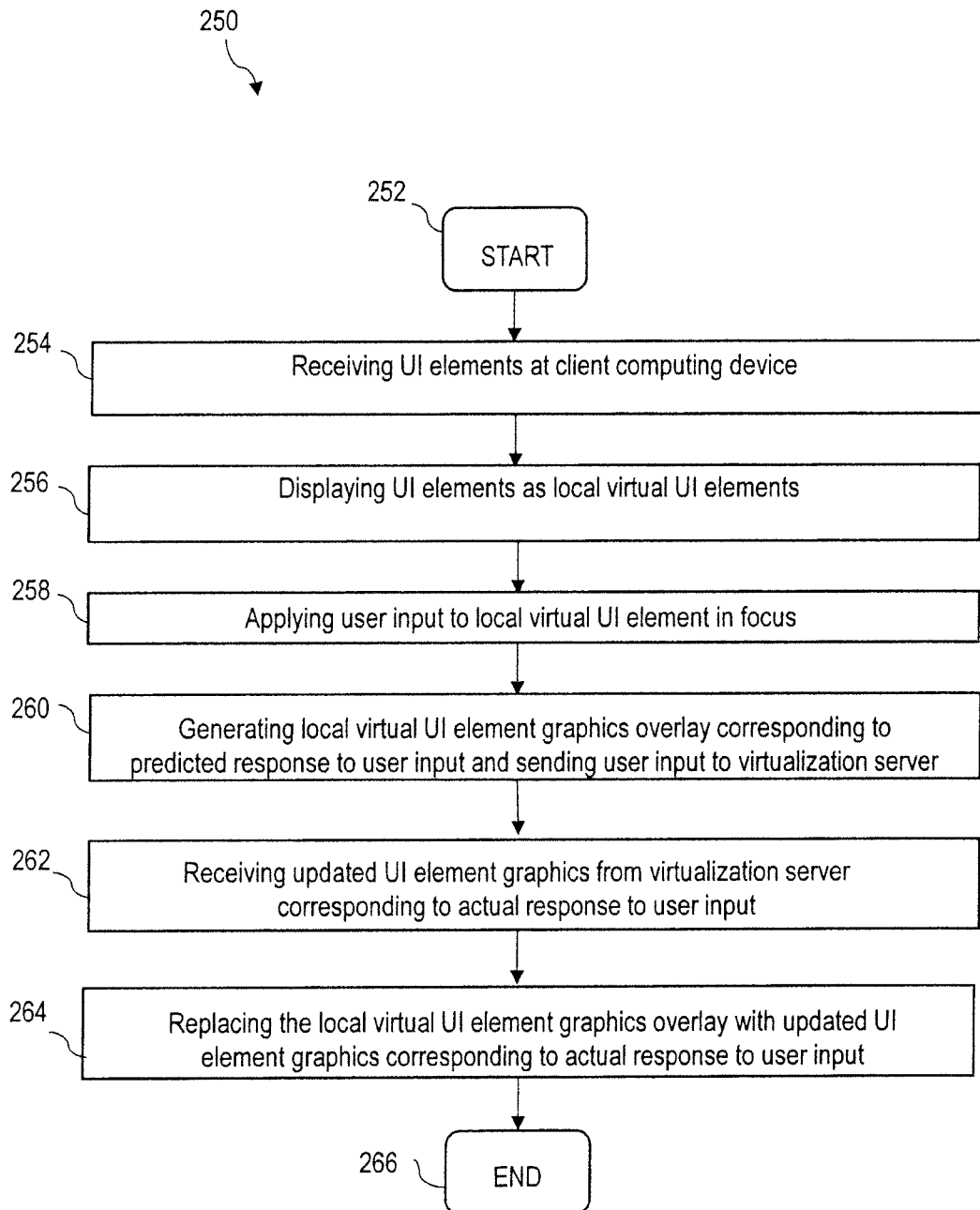
FIG. 4 is a flowchart illustrating a method for operating the client computing device illustrated in FIG. 3.
Figure 5:
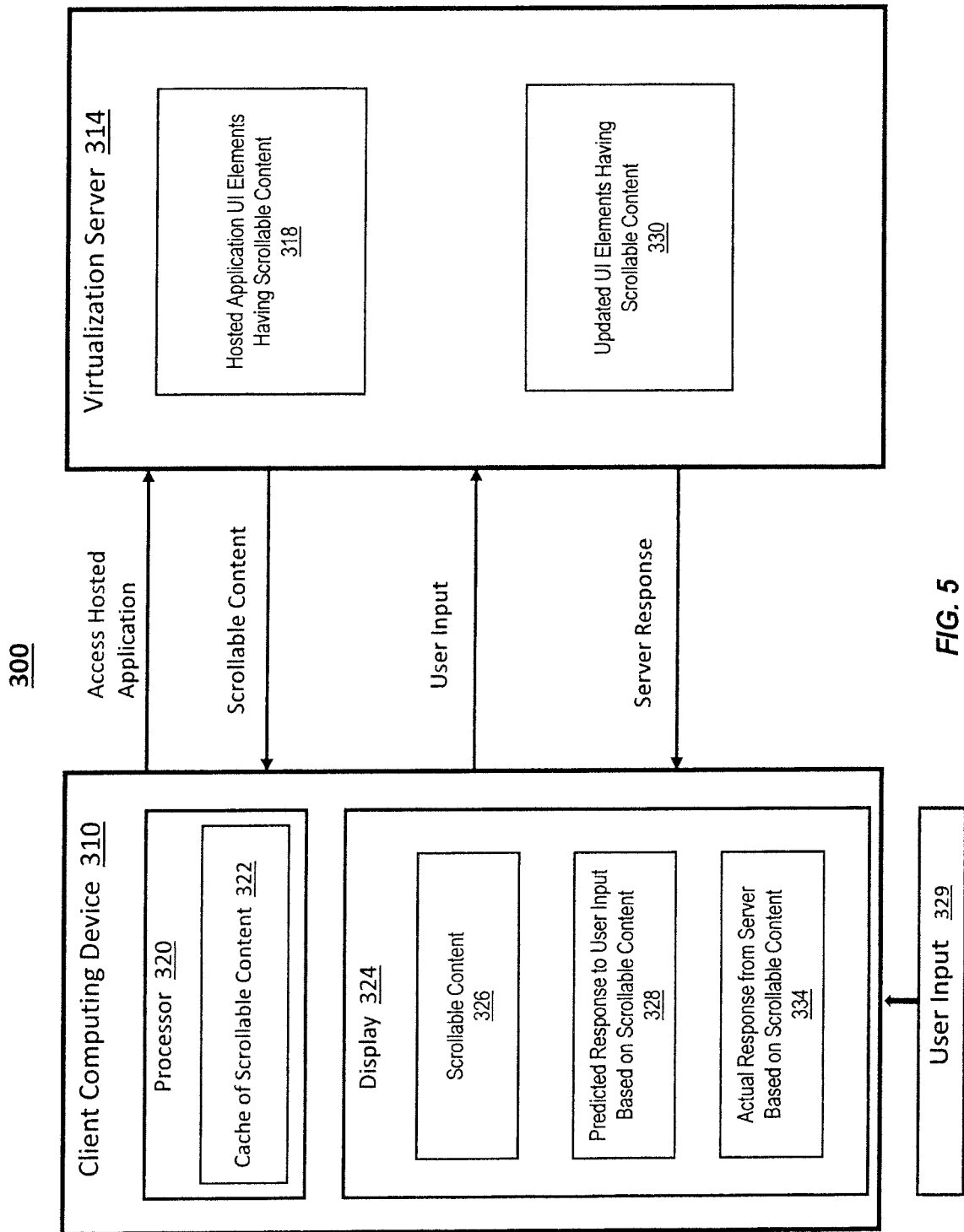
FIG. 5 is a block diagram of the computing system of FIG. 3 in a second aspect that includes a client computing device that displays UI elements having scrollable content and the virtualization server that provides updated UI elements.
Figure 6:
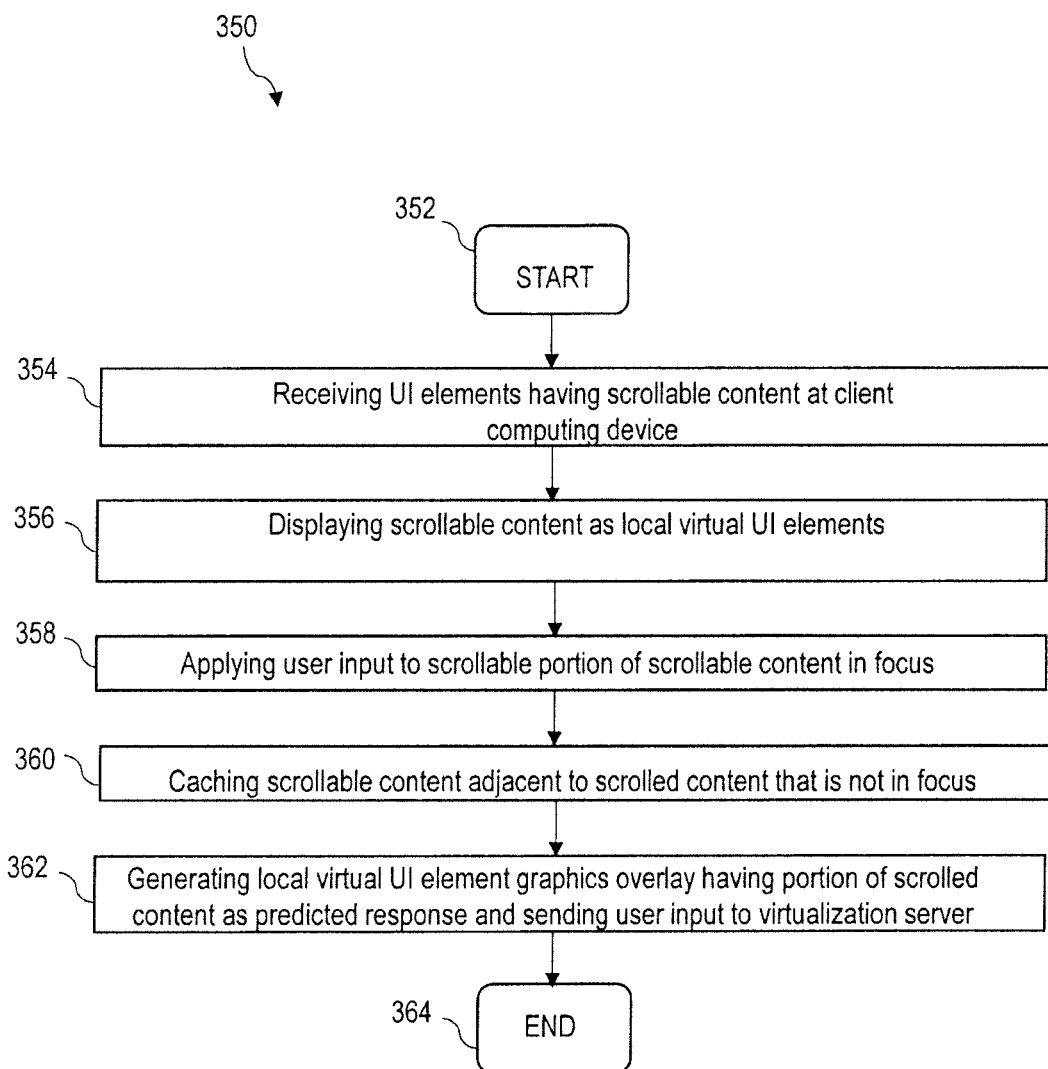
FIG. 6 is a flowchart illustrating a method for operating the client computing device illustrated in FIG. 5.
Figure 7:
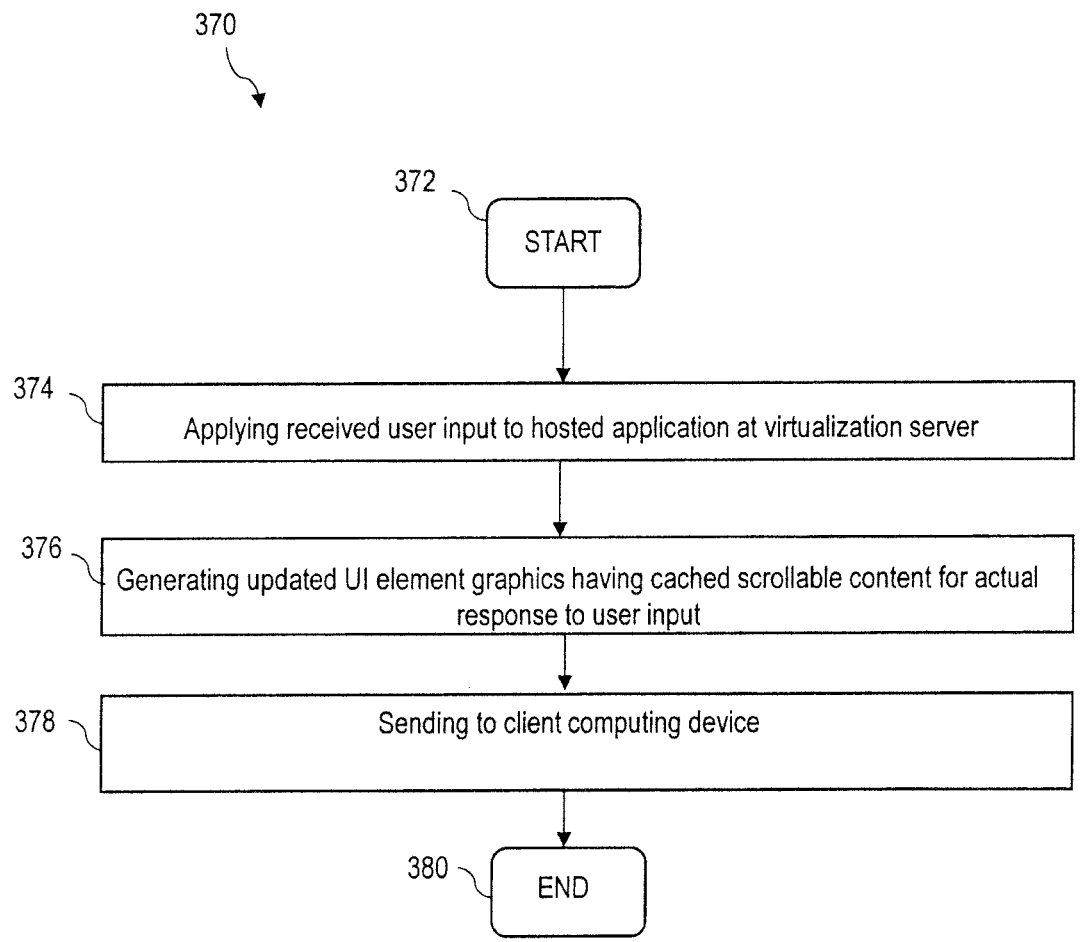
FIG. 7 is a flowchart illustrating a method for operating the virtualization server illustrated in FIG. 5.
Figure 8:
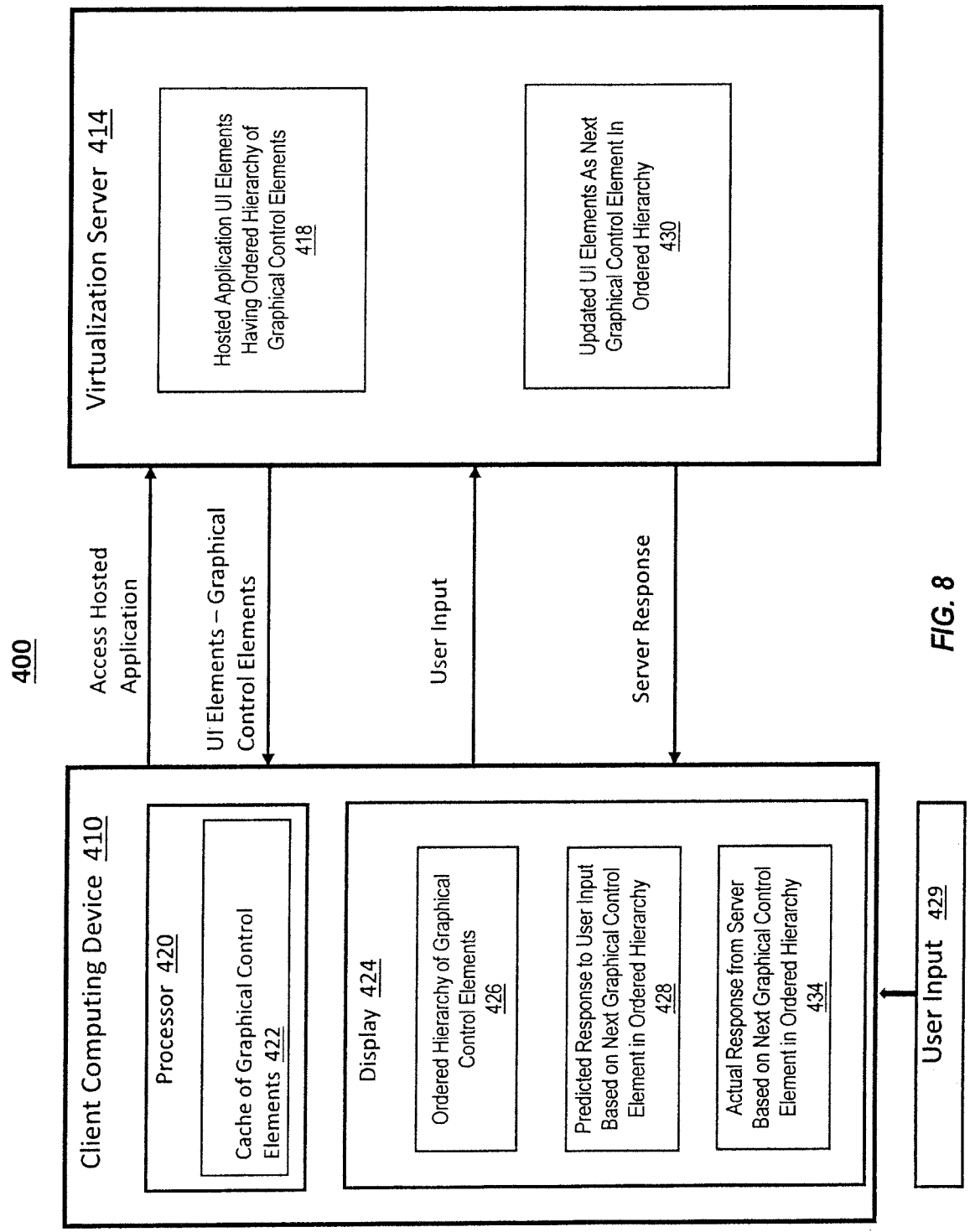
FIG. 8 is a block diagram of the computing system of FIG. 3 in a third aspect that includes a client computing device that displays UI elements having an ordered hierarchy of graphical control elements and the virtualization server that provides updated UI element graphics.
Figure 9:
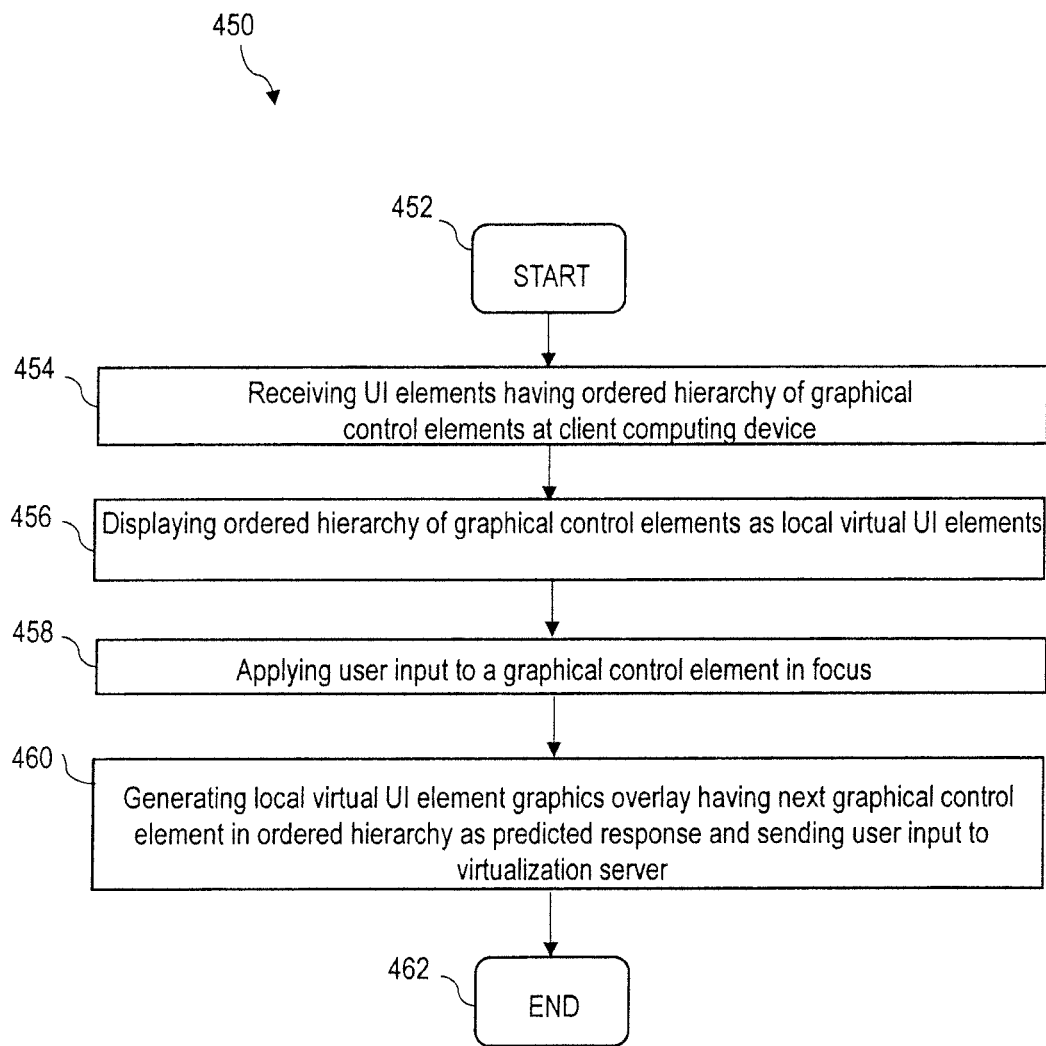
FIG. 9 is a flowchart illustrating a method for operating the client computing device illustrated in FIG. 8.
Figure 10:
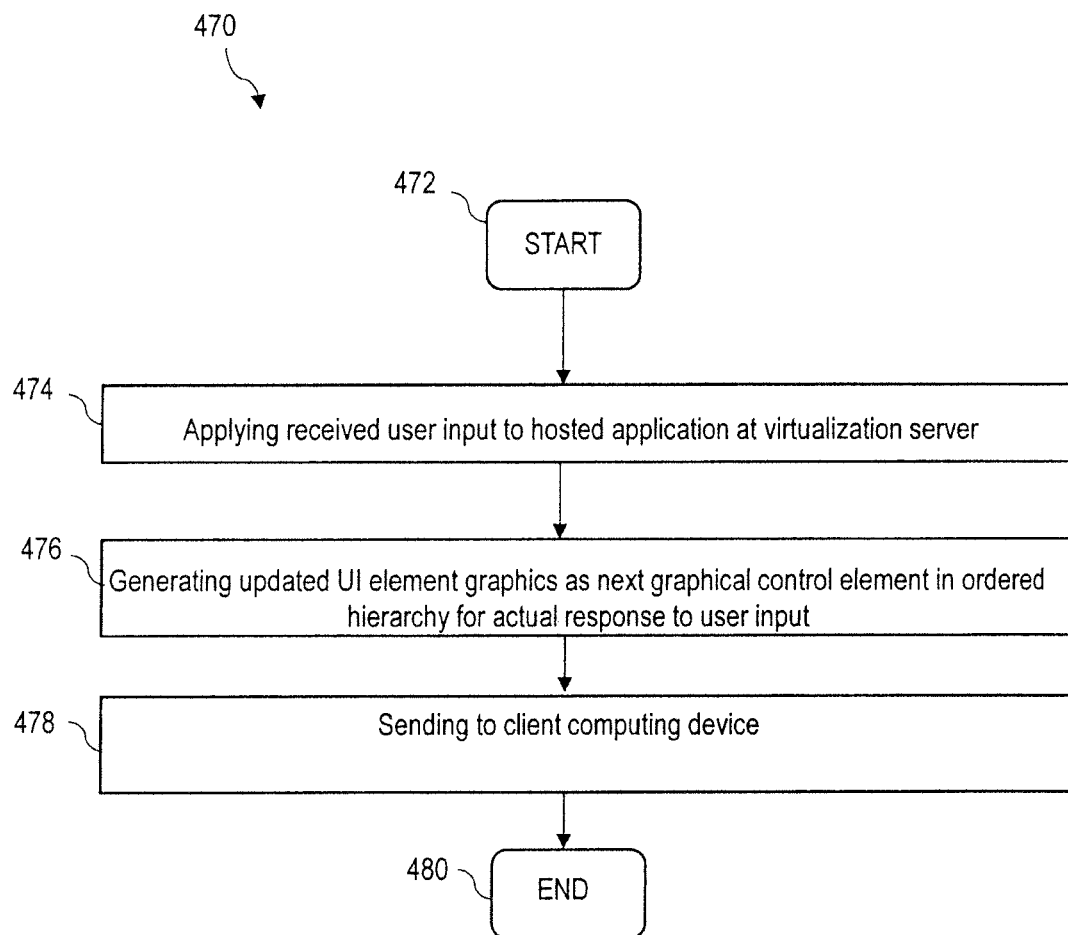
FIG. 10 is a flowchart illustrating a method for operating the virtualization server illustrated in FIG. 8.

In the description that follows, the first aspect of the computing system is shown generally at FIGS. 3 and 4, the second aspect of the computing system directed to scrolling is shown generally at FIGS. 5-7, and the third aspect of the computing system directed to the ordered hierarchy of graphical control elements is shown generally at FIGS. 8-10. These descriptions are followed by a more detailed description of the computing systems and a detailed sequence diagram of the data flow common to the computing systems, specific screenshots as non-limiting examples of what types of programs can have the reduced, i.e., zero latency navigation of UI elements, and diagrams of specific examples.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
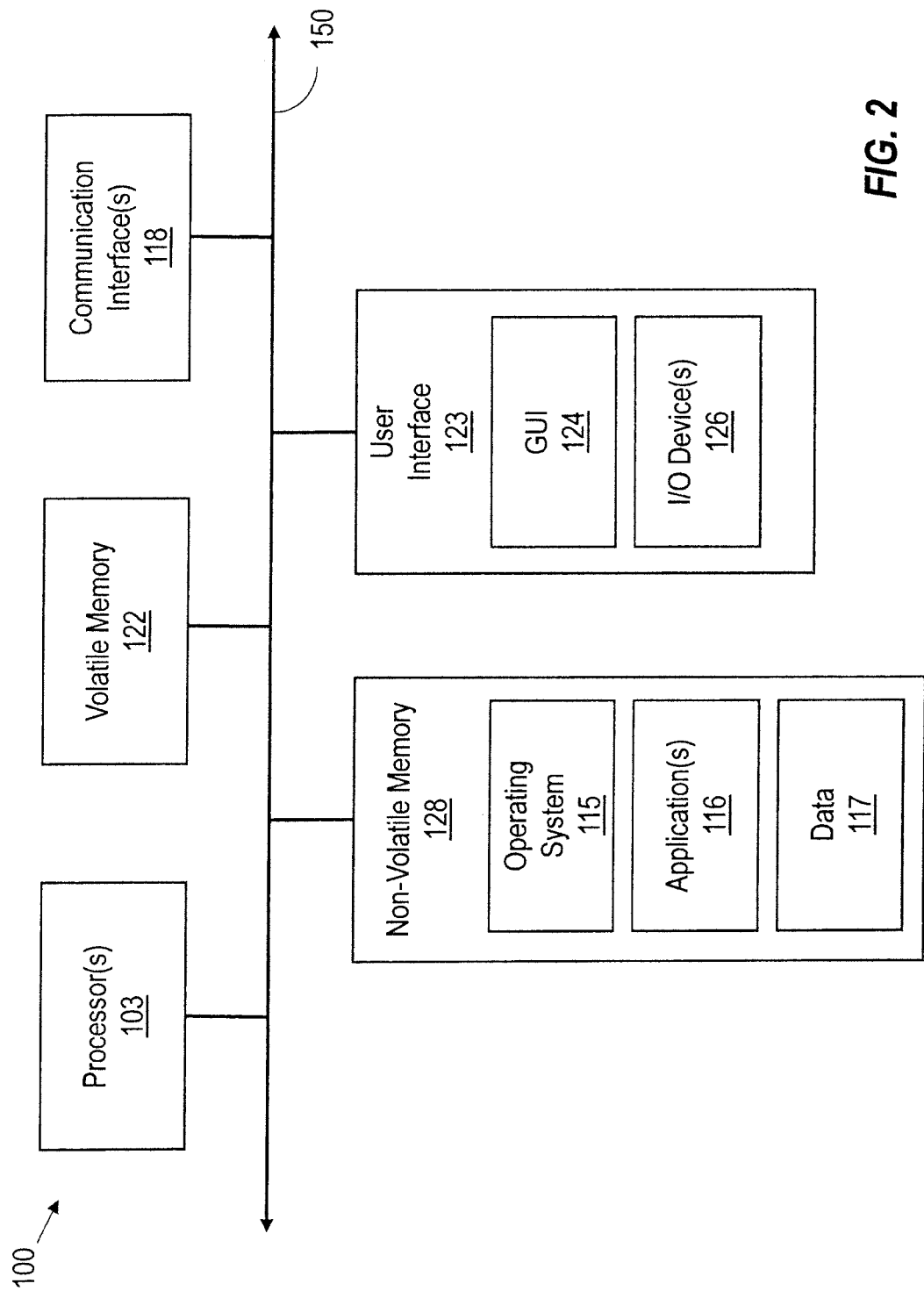
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

There now follows a description of the computing system that may incorporate the computing device 100, client device 102, server 106, and other components such that a user at a client device 102 may navigate UI elements and visually to the user, it will appear there is zero latency navigation of the UI elements since the latency has been substantially reduced by displaying the predicted and later actual response to user input.

The computing system, in accordance with the first, second and third aspects, provides a reduced and what appears to the user to be a zero latency navigation of UI elements in virtual applications. The computing system is an improvement over traditional local text echo for typing, such as disclosed in commonly assigned U.S. Pat. No. 6,538,667, the disclosure which is hereby incorporated by reference in its entirety. The computing system provides local and what appears to be instant or zero latency UI element navigation for actions such as tabbing, scrolling, navigating in grid controls, opening/closing and navigation and selecting from picker controls, menus, jump lists, changing state and toggle controls, and similar functions, using almost any user input at a keyboard, mouse, touch pad, pen, or similar input device.

The approach of local text echo for typing as disclosed in the incorporated by reference '667 patent is based on input position and font information from a virtual application. That system as disclosed in the '667 patent is currently used in the Receiver and XenApp applications manufactured by Citrix Systems, Inc. under conditions of high latency. The improvements implemented by the computing system having the reduced, i.e., zero latency navigation of UI elements may be implemented with the local text echo based on the application programming interfaces (API's) that work with modern operating systems and applications.

The computing system having reduced, i.e., zero latency navigation of UI elements detects and enumerates from a virtualization server as a host agent and caches at a client computing device selected application UI elements and content metadata, and creates virtual local UI elements that are hidden by default and overlay the UI elements at the client computing device. The computing system thus provides an immediate visible predicted or approximate response to the user input and eventually substitutes that predicted response with the actual response as a postresponse, for example, based on the estimated latency and/or by receiving graphic updates in the area of the user interface in focus. This computing system is advantageous because as more workloads are integrated into a Cloud network, such as the Citrix Cloud as a non-limiting example, and data centers are consolidated across different continents, the network conditions between the workloads and the endpoints, e.g., a client computing device, become more challenging to implement and have much higher latency and packet loss. As such, the systems and methods set forth herein advantageously provide improved performance within a virtualized and/or enterprise computing environment.

Referring now to FIG. 3, the computing system in a first aspect is indicated generally at 200 and includes at least one client computing device 210 in communication with the virtualization server 214, which is configured to run virtual machine sessions and provide a hosted application during the virtual machine sessions. The hosted application includes UI elements 218. The client computing device 210 includes a processor 220 that is configured to access the hosted application during one of the virtual machine sessions and receive the UI elements and includes a display 224, where the UI elements as local virtual UI elements 226 are initially displayed. The processor 220 includes a cache memory 222 to hold UI elements. The user will input data and a displayed predicted response 228 will be shown based on user input, which could be from a user input device 229 such as a keyboard, mouse, touch pad, pen or other user input device. The client computing device 210 sends user input to the virtualization server 214, which applies the received user input to the hosted application and processes the data and generates a set of data, which corresponds to an updated UI element graphics 230, corresponding to an actual response to the user input. The virtualization server sends the data as the updated UI element graphics 230 to the client computing device 210, which replaces at least a portion of the local virtual UI element graphics overlay corresponding to the predicted response on the display 224 with the data received as the updated UI element graphics corresponding to a display of the data as the actual response 234 to the user input.

Referring now to the flowchart in FIG. 4 and generally speaking, a method for operating a client computing device 210 that includes the display 224 and processor 220 are discussed in conjunction with the virtualization server 214 and illustrated at 250. From the start (Block 252), the method includes receiving UI elements at the client computing device 210 after accessing the hosted application having UI elements during one of the virtual machine sessions (Block 254), and displaying the UI elements as local virtual UI elements (Block 256). The method continues by applying the user input to a local virtual UI element in focus (Block 258) and generating a local virtual UI element graphics overlay for display corresponding to a predicted response to the user input from the virtualization server and sending that user input to the virtualization server (Block 260), which will apply it to the hosted application. In response, the method continues with the virtualization server 214 generating an updated UI element graphics corresponding to an actual response to the user input from the virtualization server and sending the updated UI element graphics to the at least one client computing device (Block 262). At that time, the client computing device is operative for replacing the local virtual UI element graphics overlay with at least a portion of the local virtual UI element graphics overlay that corresponds to the predicted response with the received updated UI element graphics corresponding to the actual response to the user input (Block 264). The method ends at Block 266.

This first aspect described generally at FIGS. 3 and 4 is also directed to a non-transitory computer readable medium for operating the virtualization server in communication with the virtual machine sessions provided by at least one client computing device 210 and providing a hosted application that includes user interface (UI) elements and with the non-transitory computer readable medium having a plurality of computer executable instructions for causing the at least one client computing device 210 to perform steps that include accessing the hosted application from the at least one client computing device during one of the virtual machine sessions and receiving the UI elements 218, displaying the UI elements as local virtual UI elements, applying user input to one of the local virtual UI elements in focus, and generating a local virtual UI element graphics overlay for display corresponding to a predicted response to the user input from the visualization server. In response to the visualization server updating UI element graphics, the non-transitory computer readable medium causes at least one client computing device 210 to be operative for receiving the updated UI element graphics and replacing at least a portion of the local virtual UI element graphics overlay corresponding to the predicted response to the user input with the received updated UI element graphics corresponding to the actual response to the user input.

In operation of the computing system 200, further functional enhancements of the reduced latency navigation may occur wherein replacement of the local virtual UI element graphics overlay with the received updated UI element graphics may be performed by hiding the said local virtual UI element graphics overlay and unveiling the said received updated UI element graphics underneath the said local virtual UI element graphics overlay. In an example, all of the local virtual UI element graphics overlay may be replaced with the received updated UI element graphics. This replacing at least a portion of the local virtual UI element graphics overlay with the received updated UI element graphics may be based on an estimated latency between the virtualization server 214 and the at least one client computing device 210, for example, at least one of an average, a median, and a standard deviation of latencies between the visualization server and the at least one client computing device. The replacing may also be based on one or more of receiving the updated UI element graphics, heuristics specific to receiving the updated UI element graphics, and policies associated with displaying the received updated UI element graphics.

The UI elements may include metadata, such as encrypted text, and include at least one of UI automation properties and events retrieved from the hosted application. The local virtual UI element graphics overlay may be deleted based on one or more of replacing the said local virtual UI element graphics overlay with the received updated UI element graphics, a hosted application process terminating, a hosted application window closing, a hosted application UI element getting out of focus, a hosted application UI element becoming hidden, a hosted application UI element being deleted, heuristics specific to receiving the hosted application UI element, and policies associated with displaying the received hosted application UI element.

A second aspect of the computing system is shown in FIG. 5 and designated generally at 300, and for purposes of description, components in this computing system common with those components in FIG. 3 are given the same numerical indicia, but described in the 300 series. The client computing device 310 includes its processor 320 and furthermore a cache memory 322 to hold scrollable content. The virtualization server 314 includes the hosted application 318 with its UI elements having scrollable content. At the client computing device 310, the display 324 shows scrollable content 326 as received from the virtualization server and shows the predicted response 328 to user input 329, based on the scrollable content, and in sequence, shows the actual response 334 as data received from the virtualization server 314 based on scrollable content. The virtualization server 314 processes user input and generates data as a updated UI elements 330 having scrollable content that is sent to the client computing device 310 to show on the display 324 as the actual response 334.

Referring now to the flowchart in FIG. 6, the method for operating the client computing device 310 using the computing system 300 of FIG. 5 is illustrated generally at 350. The method starts (Block 352) and includes receiving the UI elements having scrollable content at the client computing device after accessing the hosted application (Block 354). The method further includes displaying the scrollable content as local virtual UI elements (Block 356) and applying the user input to a scrollable portion of the scrollable content in focus (Block 358). The method includes caching the scrollable content adjacent to a portion of the scrollable content being scrolled that is not in focus (Block 360), followed by generating local virtual UI element graphics overlay having a portion of scrollable content as a predicted response to the user input and sending the user input to the virtualization server (Block 362). The method ends at Block 364.

Referring now to FIG. 7, the method of operating the visualization server 314 in the computing system 300 shown in FIG. 5 is illustrated at 370. The process starts (Block 372) and the virtualization server 314 is operative for applying the received user input to the hosted application at the virtualization server (Block 374) and then generating updated UI element graphics having cached scrollable content for an actual response to user input (Block 376). The method continues with the virtualization server sending the updated UI element graphics having cached content to a client computing device (Block 378). The process ends at Block 380.

The estimated latency times as described relative to the computing system 200 in the first aspect shown at FIG. 3 also applies when operating the computing system 300 and navigating UI elements having scrollable content. Metadata may be associated with the scrollable contact and may include text, including at least one of a grid item, table item, spreadsheet item, list item, and data item, and encrypted text in another example. The scrollable content may be at least one of vertically scrollable content and horizontally scrollable content that includes a scroll pattern and at least one of a text pattern, grid pattern, table pattern, spreadsheet pattern, and a list pattern.

Another aspect is directed to a non-transitory computer readable medium for operating virtual machine sessions provided by a virtualization server 314 in communication with at least one client computing device 310 and providing a hosted application that includes UI elements having scrollable content that are displayed at the client computing device. The non-transitory computer readable medium has a plurality of computer executable instructions for causing the client computing device 310 to perform steps, including accessing the hosted application during one of the virtual machine sessions for receiving the UI elements having scrollable content, displaying at least a portion of the scrollable content as local virtual UI elements, applying user input to scroll the portion of the scrollable content in focus, caching scrollable content that is positioned adjacent the portion of the scrollable content being scrolled that is not in focus, generating a local virtual UI element graphics overlay that includes at least a portion of the cached scrollable content for display corresponding to a predicted response to the user input and sending the user input to the virtualization server.

Referring now to FIG. 8, there is illustrated a third aspect of the computing system and illustrated generally at 400, and for purposes of description, functional components in this computing system common with those components in FIG. 3 are given the same numerals indicia, but described in the 400 series. The processor 420 at the client computing device 410 includes a cache memory 422 that contains graphical control elements. The virtualization server 414 has a hosted application that includes UI elements 418 having an ordered hierarchy of graphical control elements when sequenced therethrough. The display 424 at the client computing device 410 displays data corresponding to an ordered hierarchy of graphical control elements 426 and will display data as a predicted response 428 to user input such as typing or other user input on the input device 429, based on the next graphical control element in the ordered hierarchy. The virtualization server 414 receives the user input and processes it to obtain data for the updated UI element graphics 430 as the next graphical control element in the ordered hierarchy. The display 424 at the client computing device 410 shows data for the actual response 434 from the virtualization server 414 based on the next graphical control element in the ordered hierarchy when sequenced therethrough.

Referring now to the flowchart in FIG. 9, detailed steps for operating the client computing device 410 are discussed and illustrated at 450. From the start (Block 452), the method includes receiving UI elements having an ordered hierarchy of graphical control elements when sequenced therethrough (Block 454). The client computing device 410 is operative for displaying the ordered hierarchy of graphical control elements as local virtual UI elements after accessing the hosted application (Block 456) and applying user input to a graphical control element in focus (Block 458). The client computing device 410 is further operative for generating a local virtual UI element graphics overlay having the next graphical control element in the ordered hierarchy as a predicted response to user input and sending the user input to the virtualization server 414 (Block 460). The process ends (Block 462).

Referring now to FIG. 10, detailed steps for operating the virtualization server 414 of the computing system 400 are discussed and illustrated at 470. From the start (Block 472), the method includes applying the received user input to the hosted application at the virtualization server 414 (Block 474) and generating an updated UI element graphics as a next graphical control element in the ordered hierarchy for the actual response to user input (Block 476). The method further includes sending the updated UI element graphics to the client computing device 410 (Block 478). The process ends (Block 480).

Further enhancements in operation of the computing system 400 having the UI elements and graphical control elements include replacing at least a portion of the local virtual UI element graphics overlay with the received updated UI element graphics. This function is similar as described relative to the computing systems 200 and 300 in FIGS. 3 and 5, and may include hiding the said local virtual UI element graphics overlay and unveiling the said received updated UI element graphics underneath the said local virtual UI element graphics overlay. The estimated latency between the virtualization server 414 and the at least one client computing device 410 can be similar to those latencies described about the previous computing systems 200 and 300. The client computing device 410 includes an input device 429 and with the user input being based on at least one of a user selecting tab, button, menu, jump list, toggle, and picker control via the input device. In an example, the next graphical control element in the ordered hierarchy after the graphical control element receiving the user input may be displayed as a highlighted rectangle on the at least one client computing device 410. This highlighting may be based on at least one of a border and color. The graphical control element may have data associated therewith with the data being cached within the cache memory 422 at the at least one client computing device 410. The caching by the at least one client computing device 410 may be performed when the corresponding graphical control element is in focus. For example, caching may be performed when a graphical control element of type combo box or picker control is in focus. In this example, the caching advantageously allows subsequent requests by the user to enumerate the options presented by a combo box or picker control and to make a selection to be fulfilled with reduced, i.e. zero latency. In other embodiments or depending on the type of graphical control element, the caching by the at least one client computing device 410 may be performed even when the corresponding graphical control element is not in focus. For example, caching may be performed for a graphical control element of type start menu or jump list even when the graphical control element is not in focus. In this example, the caching advantageously allows the user to enumerate the options presented by a start menu or jump list and make a selection immediately upon the corresponding graphical control element receiving focus, i.e. with zero latency. This cached data may include encrypted text such as at least one of a list item, picker control item, menu item, jump list item, and start menu item.

Similar to the functionality of the computing systems 200, 300 described above, the local virtual UI element graphics overlay may be deleted based on one or more of replacing the said local virtual UI element graphics overlay with the received updated UI element graphics, hosted application process terminating, hosted application window closing, hosted application UI element getting out of focus, hosted application UI element becoming hidden, hosted application UI element being deleted, heuristics specific to receiving the hosted application UI element, and policies associated with displaying the received hosted application UI element.

Another aspect of this computing system 400 is directed to a non-transitory computer readable medium for operating virtual machine sessions provided by a virtualization server 414 in communication with at least one client computing device 410 and providing a hosted application that includes UI elements 418 comprising an ordered hierarchy of graphical control elements when sequenced therethrough. This non-transitory computer readable medium has a plurality of computer executable instructions for causing the client computing device 410 to perform steps, including: accessing the hosted application during one of the virtual machine sessions for receiving the UI elements comprising an ordered hierarchy of graphical control elements when sequenced therethrough, displaying the ordered hierarchy of graphical control elements as local virtual UI elements, applying user input to one of the graphical control elements in focus, generating a local virtual UI element graphics overlay for display corresponding the a predicted response to the user input, with the predicted response corresponding to a next graphical control element in the ordered hierarchy after the graphical control element receiving the user input, and sending the user input to the virtualization server 414.

These computing systems 200, 300, 400 as described above relative to the specific examples that reduce latency to what appears to the user to be a zero latency, include use of the cloud-based services such as the Citrix Cloud, which can be prone to latency issues, and thus, address the latency by reducing latency in the navigation of the UI elements to what appears to be a zero latency to the user. These latency issues are often apparent in Cloud-based systems and are now described in greater detail to obtain a better understanding of the advantageous functions resulting from these computing systems 200, 300, 400 described above. Unless otherwise indicated, the reference numerals for the computing system 200, client computing device 210, virtualization server 214, and their functionality are described but basic functions apply, of course, with computing systems 300, 400 shown in FIGS. 5 and 8.

As used herein, the term cloud may refer to the Citrix Cloud as a platform that allows organizations to deploy cloud-hosted desktops and applications to end users or any other cloud based systems. For example, Citrix Systems' XenApp Essentials delivers Windows-based applications and shared, hosted desktops to any user on a client computing device 210 and provides as a service the consolidated remote access to cloud-based workloads of desktops and applications, or a hybrid combination of the cloud network and on-premises workloads with a consolidated interface. In addition, the Citrix Systems' Gateway as a Service (GWaaS), also referred to as the NetScaler Gateway Service (NGS), allows users to access remotely both the Cloud and on-premises workloads without setting up a specific customer on a gateway located at the premises. However, as the network "hops" to and from the Cloud, this "hopping" action further increases the network latencies between a virtualization server 214 and client computing device 210, creating a poor user experience and associated problems when navigating the UI elements, such as by tabbing or scrolling. As a result, the user experience working remotely is dramatically impaired. The computer system 200 with reduced, i.e., zero latency navigation of UI elements addresses and solves this latency problem as noted above, and can best be evident when looked at in relation to a chart of latencies or round trip times in a system.

Figure 11:
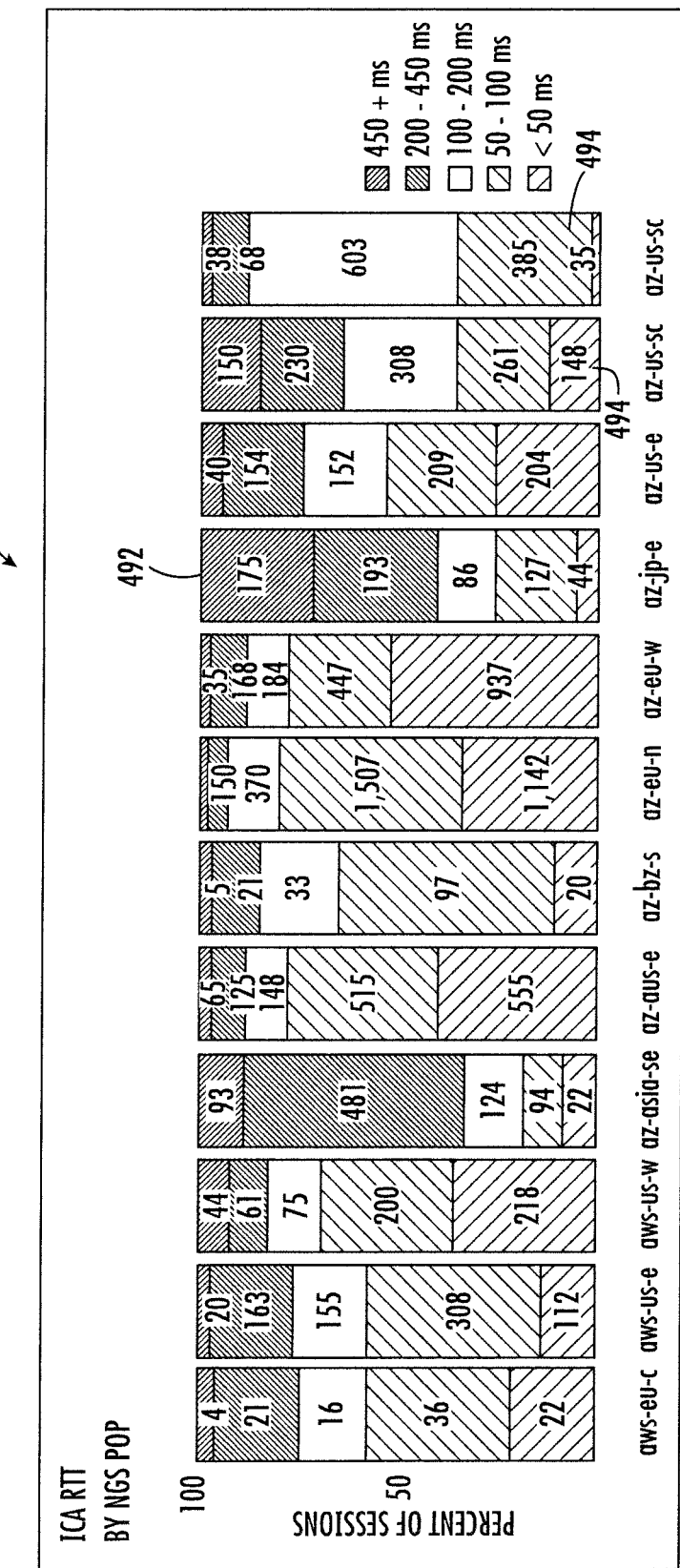
FIG. 11 is a chart showing examples of the round trip time (RTT) for different points of presence (POP) and gateways resulting in high latency experienced by users at client computing devices.

Referring now to FIG. 11, there is illustrated at 490 the ICA (Independent Computing Architecture) Round-Trip Time (RTT) for different NGS Points of Presence (POPs) based on a geographic location, showing how the different aspects of the computing system 200 disclosed above are beneficial since the lag time is reduced when using the computing system for reduced, i.e., zero latency navigation of UI elements. In the graph of FIG. 11, the different measurements are based on an HDX session over TCP as the transport protocol. Citrix Systems' HDX technology provides the high definition user experience of virtual desktops similar to a remote display protocol and includes the ICA protocol. The ICA RTT measures the interactivity of the HDX session as a click-to-photon rate, which is the time difference between a user input event, such as the user's input on a keyboard, mouse or touch pad, and the corresponding graphics update generated by the hosted application and delivered at the client computing device 210. As illustrated, without using the improvements derived from computing systems with the reduced, i.e., zero latency navigation of UI elements described above, the lag time is not inconsequential and results in severe degradation of the user experience at a client computing device 210. Also, it should be understood that the ICA RTT is not necessarily equal to the network layer 7 latency because ICA RTT can be influenced by the application response time, the server load and other factors.

The user experience with Asia-Pacific workloads is particularly challenging since the lag time is high as illustrated at the bar chart at 492 (az-jp-e). Even in the United States, over 50% of the connections incur an ICA RTT of 100 ms or higher such as the az-us-w or az-us-sc illustrated at the bar charts at 494. There are additional cases of users in remote branch office locations using a VSAT (very small aperture terminal) as a satellite communications system and having connections with 1000-2000 ms latency. In addition, high resolution monitors, e.g., about 4K, and other multi-monitor displays will make graphic loads have an even higher latency, further diminishing the user experience when operating remotely. Conversely, when using mobile devices, while resolutions are lower, there is an expectation of native-like application responsiveness when remotely connected. The current user experience without the reduced, i.e., zero latency navigation of UI elements, "lags" in normal office workloads such as typing, mouse or touch window dragging, scrolling, application switching and similar functions. The user experience also "lags" when using three-dimensional gaming software while interacting with complex 3D graphics models, and when using Virtual Reality (VR) applications when remote, such as with the Citrix XenApp hosted applications.

The computing systems 200, 300, 400 as described allow reduced, i.e., zero latency navigation of UI elements to the point where a user believes they are experiencing no latency. Benefits in improving latency delays have been found in some systems when a shift to UDP (User Datagram Protocol) as the transport protocol is achieved to overcome some of the limitations of the TCP (Transport Control Protocol). It is known that TCP uses the Additive Increments Multiplicative Decrements (AIMD) congestion control algorithm, but it cannot fully use the bandwidth in conditions of latency and loss. In modern networks, the bandwidth tends to be more plentiful and packet loss occurs primarily due to endpoint interference and stochastic loss and not congestion. Therefore, some packet loss can be tolerated without drastically reducing throughput. For example, different software manufacturer product families are migrating to QUIC as an experimental transport layer network protocol designed by Google. The Citrix Systems' HDX has recently introduced the Enlightened Data Transport (EDT) protocol, which is a reliable-transmission UDP-based protocol that has better congestion and flow control than TCP in challenging network conditions. For a typical transoceanic WAN (Wide Area Network) of 250 ms RTT and 1% packet loss each way, the HDX over EDT as a transport mechanism performs better than that over TCP, and thus, may allow a better reduced latency navigation of UI elements in the example computing systems 200, 300, 400. The interactivity is up to 2.5 times better, depending on the workload, such as scrolling text in a Notepad program vs. a webpage with images. It is also better because of the client drive mapping (remote file copy), e.g., up to a tenfold improvement, and with printing improved two-fold. A generic USB redirection may have up to a 35% improvement. The more stream-oriented and less interactive the remoting technology, the higher the benefits of the EDT.

While the EDT benefits ICA virtual channels, there is still room for improvement, which is provided by the reduced, i.e., zero latency navigation of UI elements as described above. EDT is a reliable protocol, but any loss results in packet retransmissions, which invariably limits the user experience. Improvements in a default display remoting technology such as Citrix HDX Thinwire used with a progressive display for transient regions helps improve the user experience, but the user experience is still limited by the nature of the underlying transport protocol.

Commonly assigned provisional patent application Ser. No. 62/667,072 filed on May 4, 2018, the disclosure which is hereby incorporated by reference in its entirety, discloses a remote computing system that optimizes region detection, classification and update prioritization, using a hierarchical display with optimized graphics for remote communication in challenging network conditions, including those conditions having high latency and/or loss, to achieve better interactivity but at the expense of fidelity with a lossy transmission or a combination of reliable and lossy transmissions in some areas. Interactivity may be improved when Forward Error Correction (FEC) is applied to reliable transmissions, but there will be some trade-off in the overall bandwidth and processing efficiency. That type of remote computing regains fidelity when using FEC in those areas having lossy transmissions, and for that reason, achieves a better quality along with improved interactivity from the client computing device at the expense of some bandwidth and CPU. The optimal FEC algorithm is selected based on expected bit rate, percentage loss and other similar factors. User input is transmitted with aggressive FEC to optimize the transmission and avoid retransmission delays with negligible impact on the bandwidth. Yet even with these improvements, the user experience is much better when used in conjunction with the computing systems 200, 300, 400 as described.

Although there are improvements for interactivity as described above, that type of remote computing disclosed in the '072 application, even when using an optimal and aggressive FEC, does not do better than the underlying RTT, i.e., the system cannot physically do better when it comes to delivering the true updates from the hosted application. In addition, some users in remote branch office locations use VSAT connections with as much as a 1000-2000 ms latency, where the existing techniques or systems are not always sufficient for an adequate user experience, and thus, the remote computing systems 200, 300, 400 as described could be implemented to improve the user experience and allow a reduced, i.e., zero latency navigation of UI elements.

In addition to the traditional local text echo for typing as disclosed in the incorporated by reference and commonly assigned '667 patent, the computing systems 200, 300, 400 operate to reduce the latency in navigation of UI elements and provide localized and more robust navigation for actions such as tabbing, scrolling, navigating grid controls, opening and selecting from picker controls, menus and similar user input functions. Although these user actions or functions may not work for all possible applications, the computing systems 200, 300, 400 as described optimize most common use cases and applications as permits a reduced latency navigation of UI elements, which to the user appears as a zero latency.

Figure 12:
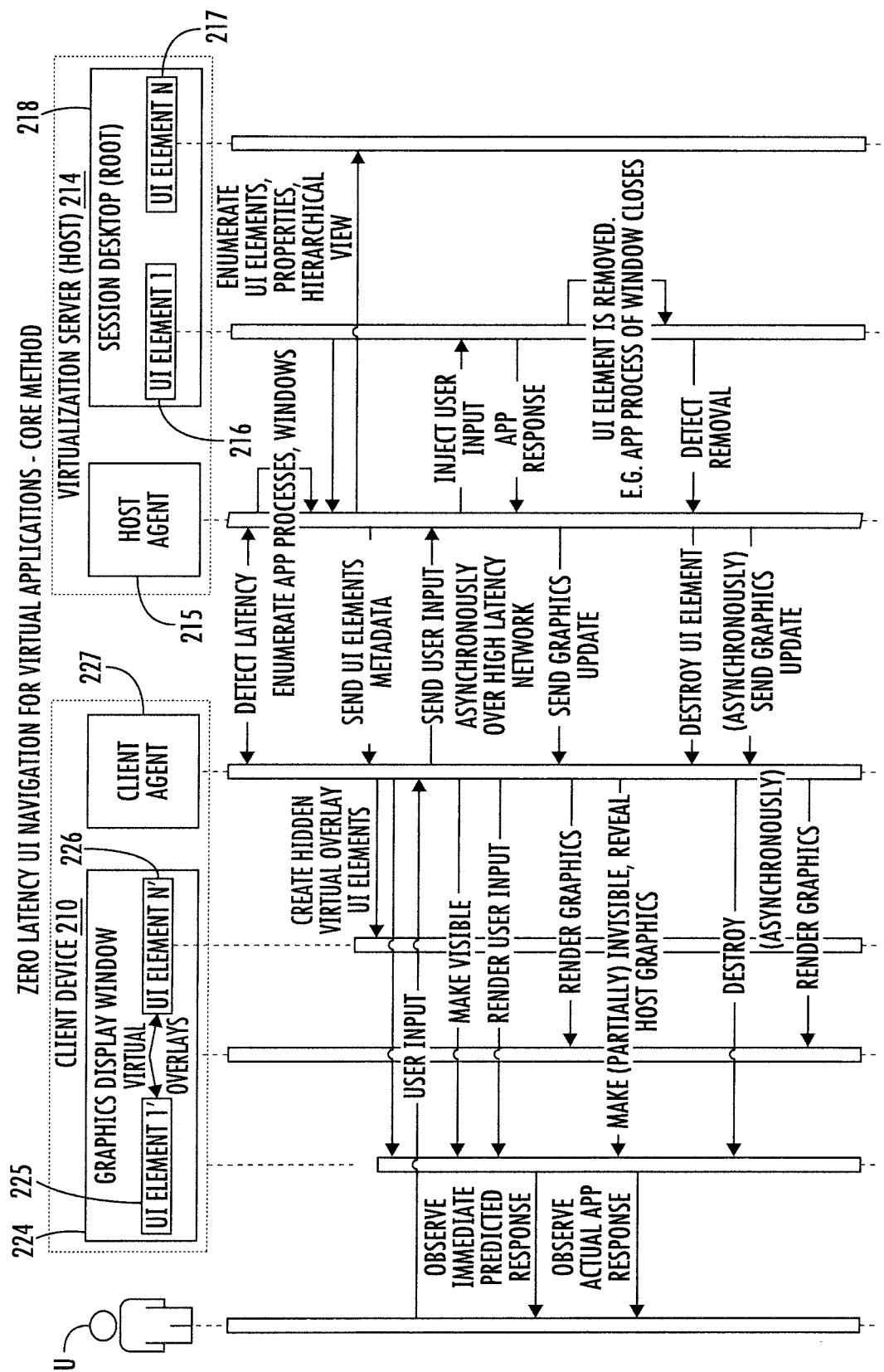
FIG. 12 is a sequence diagram showing the data flow for reduced latency navigation of UI elements common to the computing systems of FIGS. 3, 5, and 8.

Referring now to FIG. 12, there is illustrated a sequence diagram showing the general data flow that is applicable to the computing systems 200, 300 and 400 in the three aspects described at FIGS. 3, 5 and 8, and having the reduced, i.e., zero latency navigation for the virtual applications. For simplicity in description, the data flow is explained relative to the client computing device 200 of FIG. 3. A user (U) is shown diagrammatically at the top left adjacent a client device as the client computing device 210. The user (U) inputs data into the client computing device 210, which includes a display 224 and operative as the illustrated graphics display window and showing the UI element 1' (225) and the UI element N' (226) that are displayed and operative with each other via the virtual overlays such as described above. The client computing device 210 includes in this example a client agent 227 as an interface or communications agent described generally above also with reference to FIGS. 1 and 2. The virtualization server 214 operates as a host and includes a host agent 215 operative as a communications interface such as described relative to FIGS. 1 and 2, and which communicates with the client agent 227, and further includes a Session Desktop (running as the Root UI Element 218) of a hosted application with the illustrated UI Element 1 (216) and UI Element N (217). In this description of FIG. 12, the data flow sequence extends downward, vertically in time as the sequence diagram.

Communication is initiated between the interfaces at the client computing device 210 and virtualization server 214 as the respective client agent 227 and the host agent 215. The latency in communication is detected, which could include a latency standard deviation above predetermined levels or an average or median as non-limiting examples as discussed above. The host agent 215 enumerates the hosted application processes and windows and enumerates the UI elements, their properties, and a hierarchical view for some graphical control elements with respect to the computing system 400 shown in FIG. 8. The host agent 215 at the virtualization server 214 sends the UI elements metadata, including any hierarchical controls for viewing content to the client agent 227, which creates the hidden or virtual overlay as local UI elements. These are hidden by default and overlay the graphics' windows as displayed at the client computing device 210. The user provides input to the client agent 227 such as a tab, scroll or other input, which is made visible. The user input and the UI element are revealed as a visible overlay to the graphics at the display 224 as an immediate predicted (approximate) response to the user input. The client agent 227 sends the user input to the host agent 215, which applies (injects) asynchronously over a high latency network the user input to the hosted application. The virtualization server 214 responds to the user input, including any graphics update and the host agent 215 sends the graphics update to the client agent 227, which renders and reveals host graphics as updated graphics in local display windows. This is the actual application response as the observed application response. In this part of the flow sequence, the client agent 227 hides some or all the local virtual UI element overlay and reveals beneath the graphics of the actual application response. The timing of the disappearance or phase-out of the local virtual UI element overlay may depend on any combination of the estimated latency, the estimated latency standard deviation, the receiving of graphics updates in the area of the UI element in focus, the heuristics specific to the UI element patterns, the administration or user policy and similar policies as addressed above. The virtualization server 214 works asynchronously and the application process and/or window closes and the host agent 215 detects removal. In response, the host agent 215 sends a destroy command to the client agent 227 and also sends asynchronously the graphics update. The client agent 227 destroys the virtual local user interface elements and renders asynchronously the graphics.

To optimize the host processing and network traffic, the UI elements may be created only for any applications in focus, although this may reduce responsiveness immediately after bringing a new window in focus and until the new UI elements are cached at the client computing device 210, especially with reference to UI elements having scrollable data in the cache 322 or with graphical control elements in the cache 422. Some metadata may be sent to the client computing device 210, e.g., text, and it may be additionally encrypted for security, both in transit and at rest.

The computing system 200 as described allows reduced, i.e., zero latency navigation of UI elements, and includes Application Programming Interfaces (API's) that have different features, including virtual window tracking in some applications. For example, the Seamless App Support Virtual Channel (VC) subsystem supplied by Citrix Systems may enumerate and track updates at top-level windows. It may also include Virtual App (application) process monitoring, for example, as provided by a process monitoring driver used by the Seamless App Support VC subsystem supplied by Citrix Systems. Different patterns, properties and events may be retrieved from hosted applications or a desktop environment, for example, as based on the Microsoft UI Automation API (Application Programming Interface), which is the successor of the Microsoft Active Accessibility API, as found in https:\\msdn.Microsoft.com\EN-US\library\windows\desktop\EE684009 (v=vs.85).aspx. In particular, an application programming interface at the virtualization server 214 enables applications to interact with controls and other applications and retrieve information about them. The host agent 215 in the HDX session may use the Microsoft Active Accessibility API as a client to retrieve information about hosted applications and the desktop. The host agent 215 may register for specific event notifications and can request that the specific UI automation properties and control pattern information be passed into its event handlers. A UI automation API may be used to enumerate elements starting from the desktop as the root of the hierarchy, or from any window or current UI element in focus, which may be a data container for additional elements. The UI Automation API as supplied by Microsoft may be used to identify processes and windows as an alternative to the Seamless App Support VC subsystem. The Seamless Subsystem itself may be efficiently implemented based on the UI Automation API. For example, the Seamless Subsystem may register for the following events using the UI Automation API provided by Microsoft: WindowPattern.WindowOpenedEvent, WindowPattern.WindowClosedEvent. The Seamless Subsystem could also query AutomationElement.ProcessIDProperty, AutomationElement.NativeWindowHandleProperty. The remote application protocol may include process Identifiers (IDs) and window IDs for purposes of supporting both Seamless Applications and a Desktop Window mode. Local virtual overlays may be scaled or panned to account for window scaling, panning and resolution differences (Dots Per Inch (DPI)) between the client and host environments, e.g., based on the Citrix Systems' Receiver Window Positioning APIs. The network latency and latency standard deviation could be measured by the HDX transport driver provided by Citrix Systems, Inc. It should be understood that the HDX Thinwire as a Citrix XenApp Virtual Channel (VC) may operate for graphics remoting between the virtualization server 214 and the client computing device 210.

The computing system 200 handles UI element patterns and may also include an improved text echo with the host agent 215, for example, detecting the focus in a text element, e.g., exhibiting a pattern for the text and sending the cursor position and rich font information to the client computing device 210. For example, the pattern for the text, also termed TextPattern as a data item, may include various attributes or elements that are categorized as various data items: FontSizeAttribute; FontNameAttribute; MixedAttributeValue; FontWeightAttribute (thin, light, normal, medium, bold, heavy, etc.); IsItalicAttribute; IsSuperscriptAttribute; ForegroundColorAttribute; BackgroudColorAttribute; BulletStyleAttribte; HorizontalTextAlignmentAttribute; IndentationLeadingAttribute; IndentationTrailingAttribute; MarginTopAttribute; MarginTrailingAttribute; IsHiddenAttribute; TextFlowDirectionsAttribute (Default: Top to bottom, left to right, horizontal); and similar attributes.

The client computing device 210 may present a virtual local UI element overlay of the type text field, located at a respective cursor position, and with the font consistent with the received font attributes. As the user types on the input device 229, the client computing device 210 provides immediate text response in the overlay field. As noted before, a general explanation of simplified local text echo is described in the incorporated by reference and commonly assigned '667 patent, but the reduced, i.e., zero latency navigation of the computing system 200 improves this text echo by supporting both Seamless Apps and Desktop mode, panning, scaling, DPI differences and similar functional items. The computing system 200 may account for text container margins and not going beyond margins.

For example, while typing towards the end of the line in a text document, the computing system 200 may avoid going off the right end of the visible page. The expected behavior is wrapping around to a new line. This can be achieved based on knowledge of container margins, complete font information such as line spacing, indentation and similar items with sufficient surrounding text context. For example, the surrounding text can be retrieved by means of the data items and program routines associated with a TextRange control pattern using the text pattern.range from point API, TextPatternRange.ExpandToEnclosingUnit API or other related APIs, and specifying the amount by which to move or change the size of the text range in units (TextUnit) of character and format where the text shares all the same attributes. This also may include a word, line, paragraph, page or a whole document. The computing system 200 may send and cache at the client computing device 210 sufficient text context around the cursor focus to allow for local auto-correction of typed text and the proper letter capitalization, word correction or suggestions. The computing system 200 may take into account the boundary of an embedded object such as an image or hyperlink.

The computing system 200 may also provide for tab stops with the respective correct positions for tab stops occurring by enumerating them. For example, it is possible to use a GetAttributeValue API as provided by Citrix Systems to retrieve the TextPattern.TabsAttribute as a collection of tab stops and points and associated with various graphics. It is possible to determine if the UI element content is protected, for example, using a password field, based on a data and program routine AutomationElement.ISPasswordProperty. The client computing device 210 may then provide a local overlay with an asterisk and additionally encrypt the text sent to the virtualization server 214.

Figure 13:
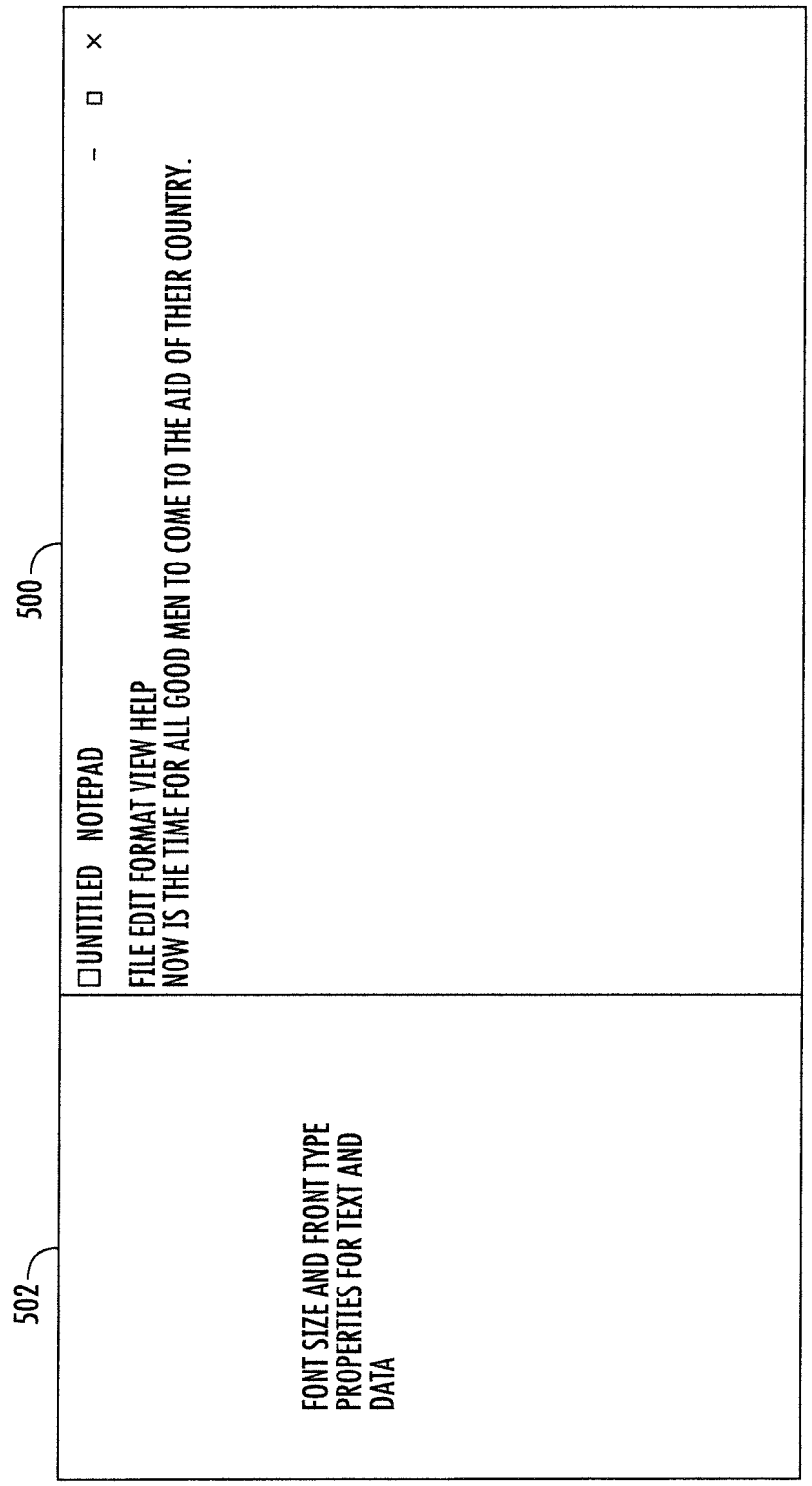
FIG. 13 is an example screenshot of retrieving text and font properties under the cursor in a Notepad program when operating the computing system for reduced latency navigation of UI elements.

Referring now to FIG. 13, there is illustrated an example screenshot at 500 as an example for the application of the reduced, i.e., zero latency navigation of UI elements and showing the automation and retrieving of text, such as a word scope, and the font properties under the cursor in an example Notepad program. The font and text properties such as font size and font type are described generally at the left at 502 with a general description labeled as Font Size and Font Type Properties for Text and Data, but would in an actual screenshot include a complete listing of such properties and displayed to the user in this example.

Figure 14:
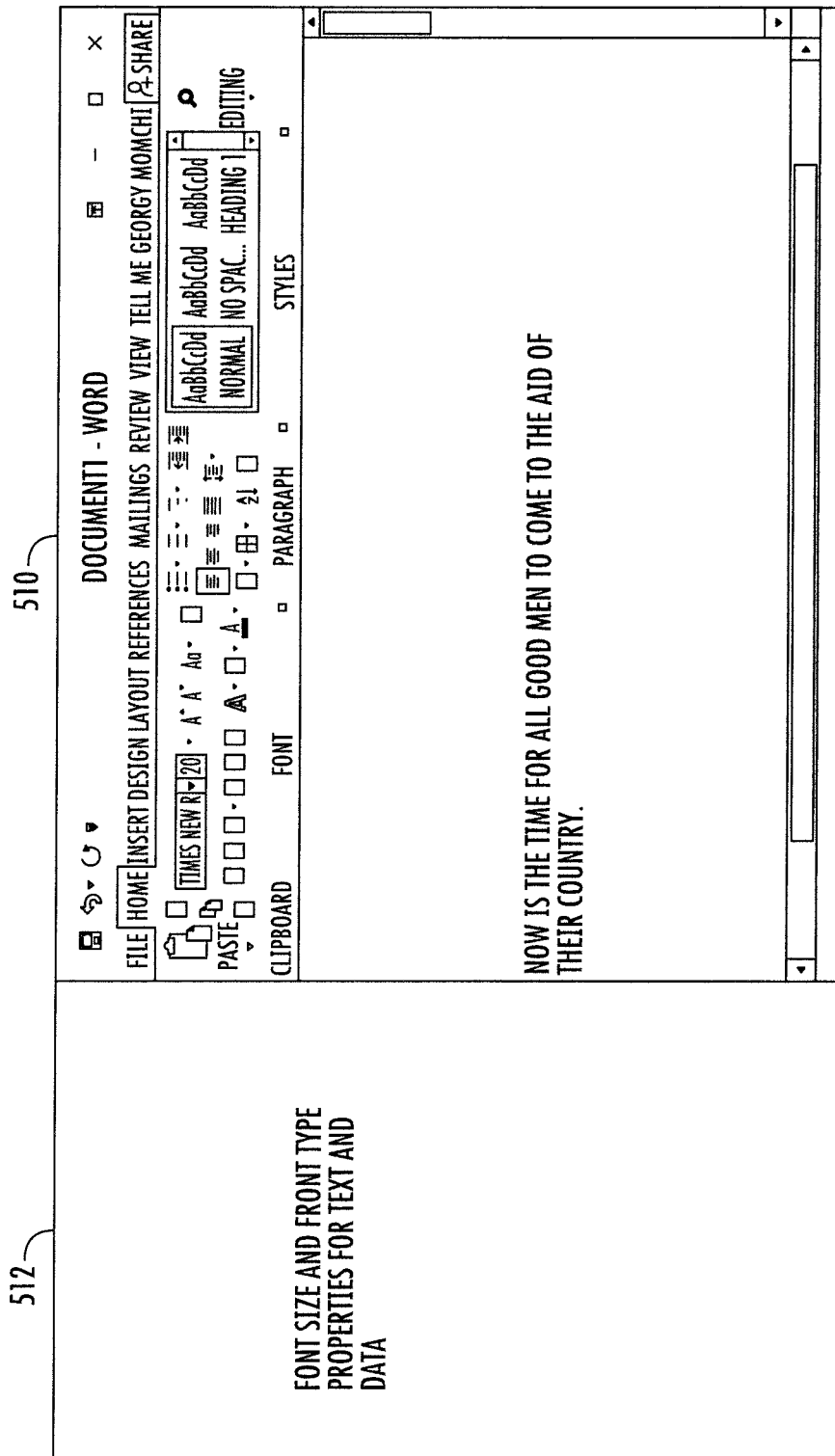
FIG. 14 is another example screenshot similar to that of FIG. 13, but with an example Microsoft Word program.

Referring now to FIG. 14, there is another example screenshot 510 similar to that screenshot of FIG. 13, but having automation and retrieving of text (word scope) and having font properties under the cursor in an example Microsoft Word program. Similar as in FIG. 13, a general description is given of the font size and font type properties generally at the left at 512.

Figure 15:
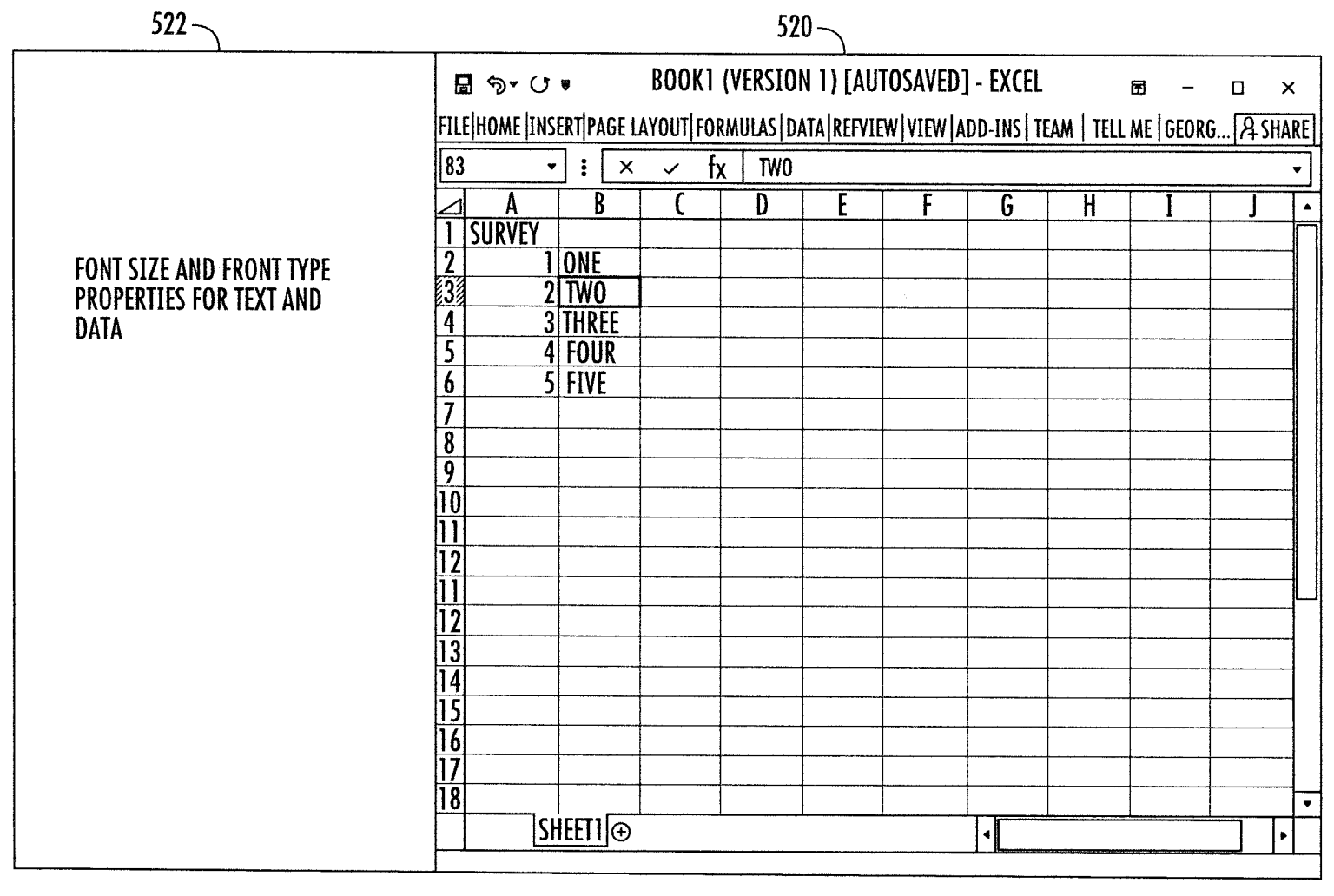

Referring now to FIG. 15, there is illustrated another screenshot at 520 and similar to that of FIGS. 13 and 14, but showing automation and retrieving of text (word scope) and font properties under the cursor in an example Microsoft Excel program. Again as in the previous two screenshots of FIGS. 13 and 14, the font type and font size properties are shown generally at 522 on the left. Those three screenshots are non-limiting examples that illustrate the wide variety of potential applications when incorporating the reduced, i.e., zero latency navigation of UI elements.

Figure 16:
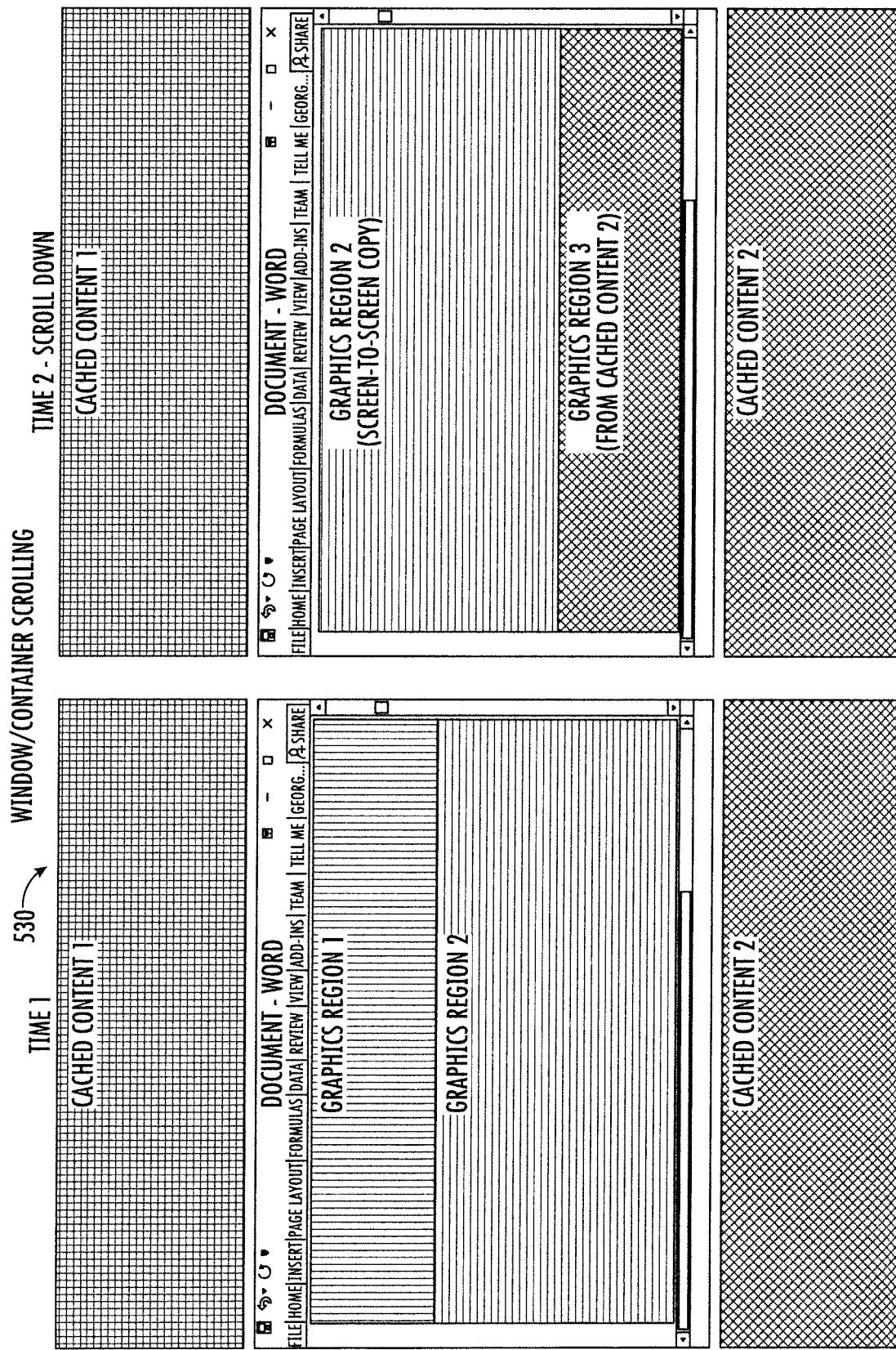
FIG. 16 is a graphical representation of cached scrollable content and graphics at Time 1 and Time 2 in a document when operating the computing system for reduced latency navigation of UI elements.

The computing system 300 in a second aspect as described above may include window and container scrolling with or without text. Referring now to FIG. 16, there is illustrated generally at 530 a fragmentary graphical diagram of a Window/Container Scrolling operation using cached content in a document, such as displayed at a user operated computer, and showing Cached Content 1 at Time 1 on the left and adjacent on the right the Cached Content 1 and the scroll down at Time 2. At Time 1, there is illustrated the Cached Content 1, Graphics Region 1, Graphics Region 2, and Cached Content 2, and on the right for the scroll down at Time 2, there is shown the Cached Content 1 and what amounts to a functional screen-to-screen copy for the Graphics Region 2 and the Graphics Region 3 that is derived from the Cached Content 2 based at Time 1 and the Cached Content 2. This fragmentary graphical diagram shows that at least a portion of the scrollable content can be displayed as the local virtual UI elements and the client computing device 310 may scroll a portion of the scrollable content in focus and then cache the scrollable content that is positioned adjacent the portion of the scrollable content being scrolled that is not in focus corresponding to graphics regions such as from the cached content as illustrated.

Figure 17:
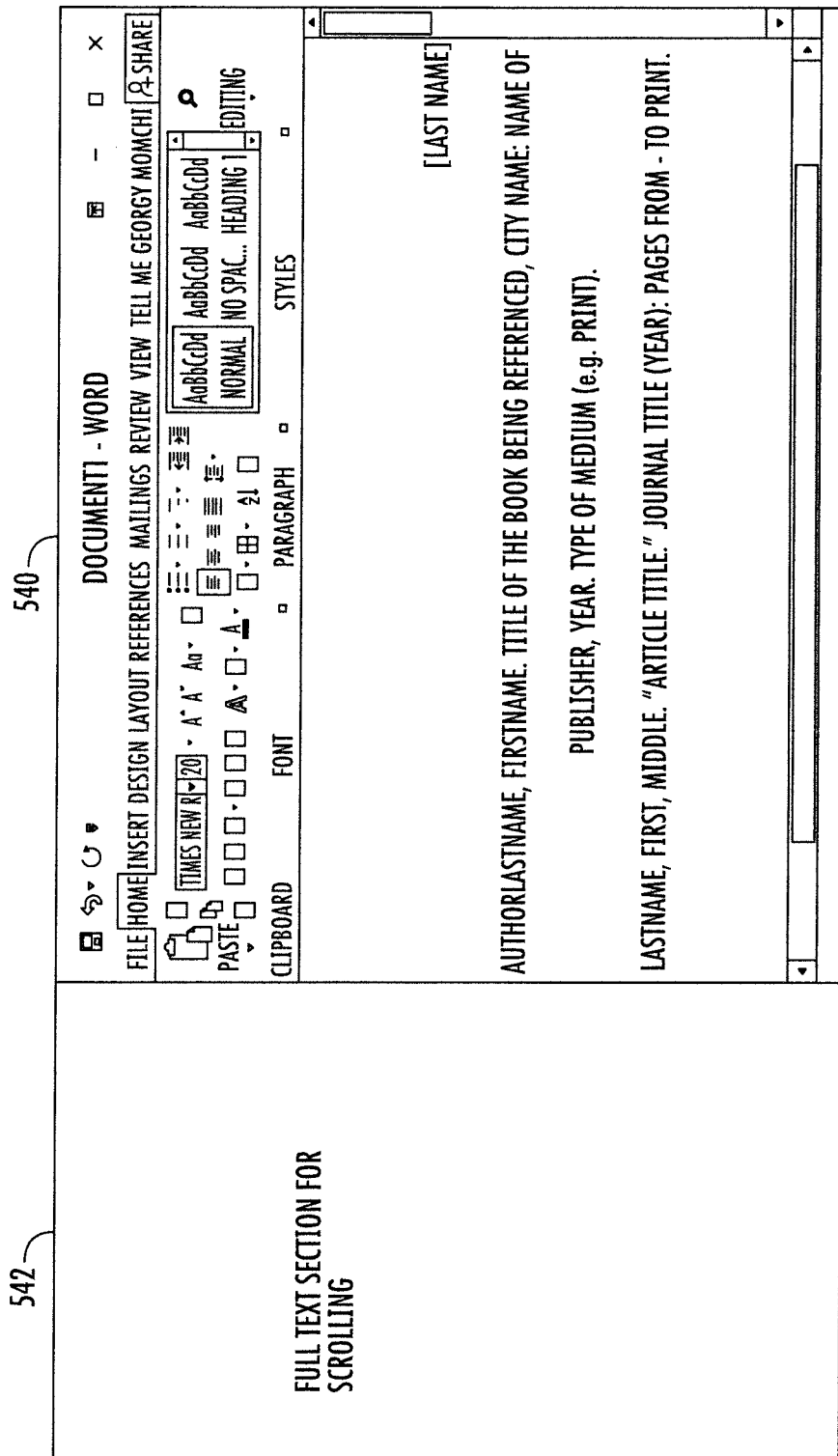
FIG. 17 is an example of a screenshot in an example scrolling and retrieving of text in a document of a Microsoft Word program when operating the computing system for reduced latency navigation of UI elements.

Referring to FIG. 17, another example of a screenshot at 540 shows an example of retrieving text (the entire document scope) and font properties under the cursor in Microsoft Word as illustrated and shows an example of what would be the full text on the left where a portion could be selected for scrolling and labeled as "Full Text Section For Scrolling" at 542 giving an example of program and data as displayed.

Figure 18:
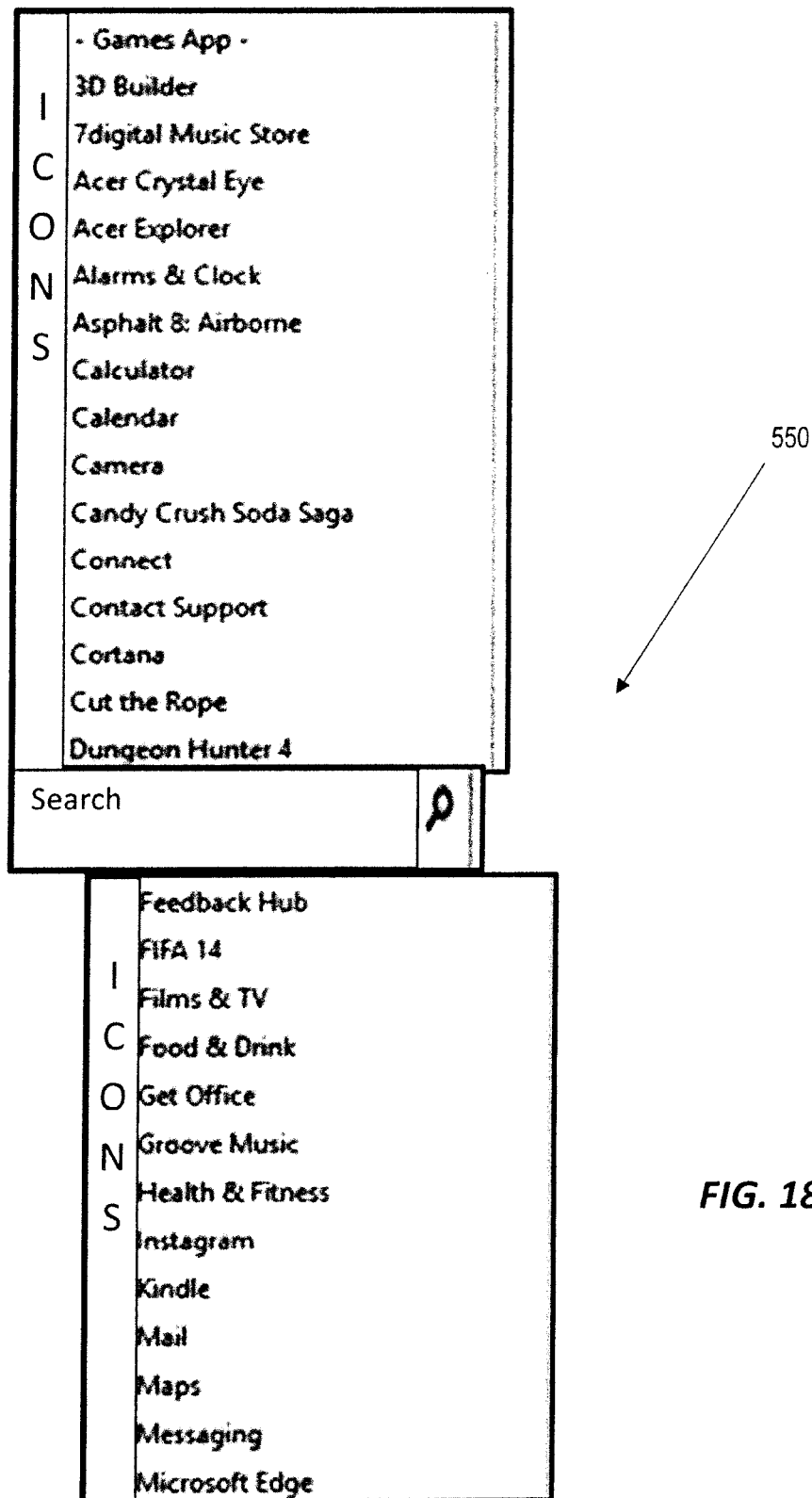
FIG. 18 is an example of a fragmentary drawing of a screenshot in an example window/container scrolling using cached content as start menu options when operating the computing system for reduced latency navigation of UI elements.

Referring to FIG. 18, a fragmentary drawing of a screenshot is indicated generally at 550 as an example of window/container scrolling using cached content as Start Menu items. Various icons are represented generally by the logo icons, indicative that icons would be displayed at that location in an actual screenshot of a Start Menu. These two screenshot views 540, 550 at FIGS. 17 and 18 illustrate the potential applications for the scrolling operation to reduce to what appears to be zero latency in the navigation of UI elements, where for the user, the experience is that of a zero latency navigation.

An example explanation for window/container scrolling with text is now described. Reference may be made to the details in the high level flow sequence of data explained at FIG. 12, but with reference to scrolling using the computing system 300 as described above. The client computing device 310 detects a container in focus with the scroll pattern and an embedded text pattern. For example, the virtualization server 314 may receive data and listen as the client computing device 310 processes data items as ScrollPattern and/or ScrollItemPattern events and property updates. The virtualization server 314 detects an embedded TextPattern as data. The client computing device 310 queries the UI element exhibiting the ScrollPattern and determines old and new values for whether the UI control is horizontally and/or vertically scrollable, and determines horizontal and vertical view sizes and horizontal and vertical scroll percentages. For example, in the computing system 300, the virtualization server 314 may retrieve values as identified by data items as the VerticallyScrollableProperty, VerticalViewSizeProperty, and VerticalScrollPercentProperty.

The virtualization server 314 may query the UI element exhibiting the text pattern by determining a text range within the element that is currently in view, for example, using routines such as described as an IUIAutomationTextRange:GetAttributeValue API with attribute parameters set to a data item as UTA_IsHiddenAttributeId. It is then possible to retrieve a text range currently beyond the view, for example, the surrounding text could be retrieved by means of the TextRange control pattern using different API's, including the TextPattern.RangeFromPoint API, the TextPatternRange.ExpandToEnclosingUnit API or other related APIs and specify the amount by which to move or change the size of a text range in units (Text Unit) of the character and format where all text that shares all the same attributes include word, line, paragraph, page or a whole document.

It is possible to have the UI element metadata sent from the virtualization server 314 to the client computing device 310, and this metadata may include the scroll pattern UI element properties described above. It may also include a range of text content beyond the currently visible area, e.g., several paragraphs or pages above or below the current view of the vertically scrollable content. It is possible to send the actual text with text attributes, including the font type, font size, foreground/background color, italic, bold, underline, line spacing and similar text attributes. The client computing device 310 may create the virtual local UI elements overlaying a corresponding local display window that are hidden by default. When the user scrolls, the client computing device 310 in effect performs a local screen-to-screen copy of the scrolled area such as shown and described relative to the window/container scrolling of FIG. 16. The client computing device 310 also performs a local fill of the exposed area with the previously cached content such as the text and attributes. Eventually the computing system 300 via the virtual server 314 displays the actual application response to the scrolling.

Rather than sending text with attributes, the virtualization server 314 may enumerate the scroll items (ScrollItemPattern) and send them as individual items to the client computing device 310 to be presented with what appears to be zero latency to the user when they move into view. An example includes scroll items in a list control (List), for example, the system Start Menu as in FIG. 18, where there may be zero or more items as data, zero or more items in a list, and zero or more data groups. Another example includes data items (DataItem, GridItemPattern) in a grid control (Data Grid, Grid Pattern), e.g., which could correspond to the next rows in a spreadsheet worksheet. Another example could use GridPattern.GetItem API as provided by the UI Automation API.

Figure 19:
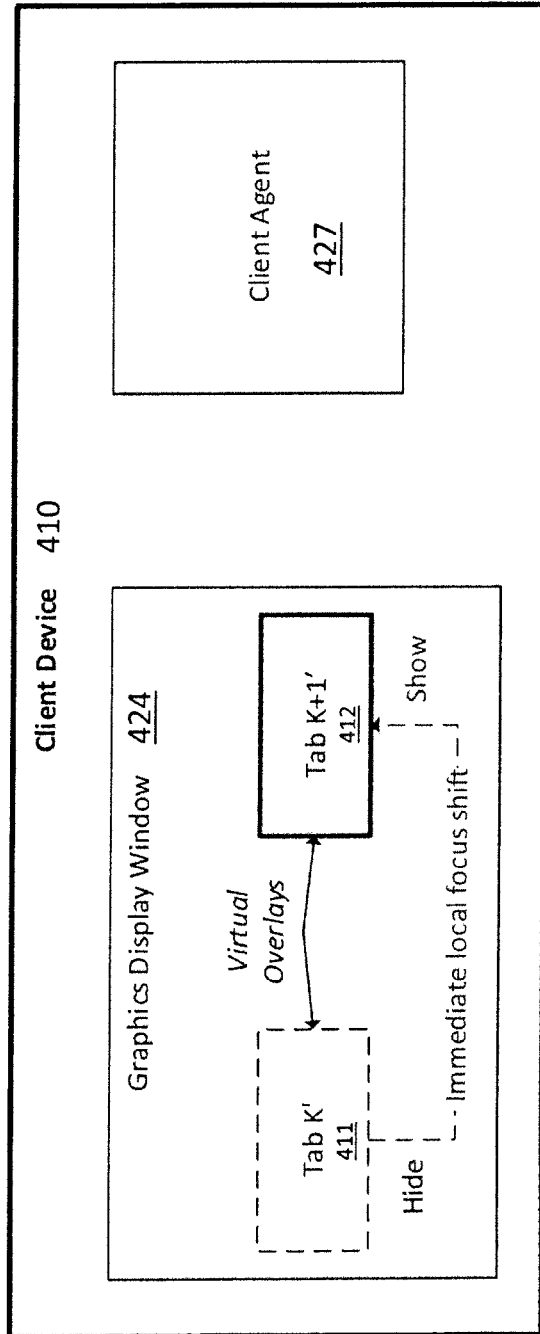
FIG. 19 is a block diagram of the client computing device and showing diagrammatically a next graphical control element as a tab in an ordered hierarchy for reduced latency navigation of UI elements.

Referring now to FIG. 19, there is illustrated an example of tab order navigation such as processed at the computing system 400 (FIG. 8) and showing at the client computing device 410 the display 424 as a graphics display window and a client agent 427 functioning similar to the client agent described relative to FIG. 12. There is an immediate local focus shift to a new virtual UI element following the tab order as an example for the tab order navigation, while selecting a next graphical control element in the ordered hierarchy. The display 424 at the client computing device 410 is operative as a Graphics Display Window and illustrated with Tab K' 411 as a hidden UI element and interconnected by Virtual Overlays to the next in sequence graphical element as the Tab K+1' 412 and showing diagrammatically by the dotted line the immediate local focus shift. This tab order navigation and its data flow is also described generally relative to the flow sequence of data described in FIG. 12.

In an example, to determine the tab order, the virtualization server 414 initially enumerates UI elements starting at the top-level parent window as the root element (RootElement) and then enumerates its children in a control view. In that enumeration, for example, the children, i.e., in this example, the next in sequence for a UI as a graphical control element as described, could be accomplished using TreeWalker, GetFirstChild and GetNextSibling API's in a remote session application and provided by Microsoft. Different commands are deployed as described. The search/walk can be optimized by adding conditions, for example, via PropertyCondition and AndCondition APIs to enumerate only elements that are controls, e.g., (AutomationElement.IsControlElementProperty), which are enabled and (AutomationElement.IsEnabledProperty), which are a tab stop, i.e., it can receive a keyboard focus as a UI element as a tab stop (IsTabStop). The relative tab order of enumerated controls can be retrieved using a defined tab index (TabIndex) of each control in combination with the enumerated order, such as left-to-right and top-to-bottom, when a specific tab index is not defined. The coordinates of the rectangle that completely encloses each element may also be retrieved as a BoundingRectangle property. The element with the current keyboard focus as a HasKeyboardFocus property is also identified.

The virtualization server 414 inserts the enumerated control elements along with their relative tab order in a hierarchal tree, e.g., a TreeNode, and remotes the hierarchy along with its top-level window handle to the client agent 427 at the client computing device 410, which recreates the tree locally as virtual local UI elements overlaying a corresponding local display window, which are hidden by default. The client agent 427 at the client computing device 410 keeps track of the current UI element with the keyboard focus.

When the user enters a "tab" on the input device such as the keyboard, the client agent 427 at the client computing device 410 may perform an immediate keyboard focus switch to the virtual local UI element that is next in the tab order and makes it visible. This allows the user to immediately start input into the new virtual local UI element in focus, e.g. a new control UI element, or continue tabbing to the next control, and thus, receive a reduced but what appears to the user to be a zero latency local feedback.

The user at the client computing device 410 may choose a new UI element in focus. The client agent 427 at the client computing device 410 may highlight it such as by a bounding rectangle. For example, it is possible to apply a rectangular graphic with a thick and/or blinking border, or impart a different color or impart a different distinguishing technique to highlight the rectangle. This may be necessary because the actual hosted application response will be delayed, and therefore, the control UI element previously in focus may still show the graphics implying the keyboard focus in the regular graphics display, even though the client agent 427 at the client computing device 410 has already switched the focus with the reduced or what appears to the user to be zero latency to the next local control in the tab order as the next graphical control element in the ordered hierarchy. The local highlighting may stop as soon as the virtualization server 414 reports a new element in focus consistent with the current virtual local UI element in focus. The computing system 400 may also include navigation in tables, data grid controls and similar functional user input items with graphical control elements.

Figure 21:
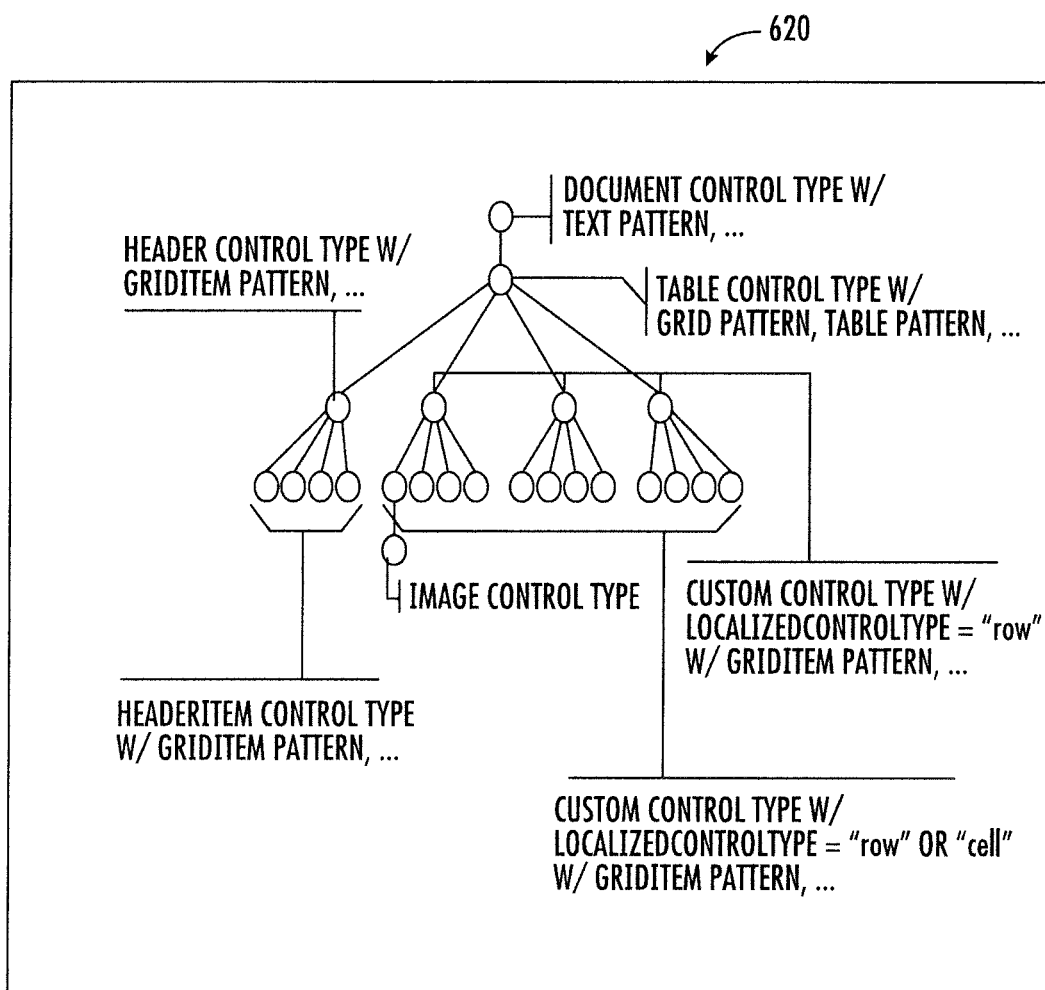
FIG. 21 is a graphical content view of the text container of the document shown in FIG. 20.

Referring now to FIG. 20, a graphical table representation of a text container as a document is shown generally at 600, and includes an embedded table 610 and flower image 614. In FIG. 21, the graphical content view as a hierarchy of this table is shown generally at 620. The embedded table 610 and flower image 614 in FIG. 20 are non-limiting examples to illustrate how the text document graphically may contain a table and, in this example, include four headers labeled header 0, header 1, header 2, and header 3, with the different value.

As shown in FIG. 21, the hierarchy view 620 of graphical control elements and the different content views of the text container are illustrated with explanations for the type of data. Some navigations such as tabbing or using the arrow keys (up, down, left and right) can be optimized by caching at the client computing device 410 metadata associated with the UI elements around the current element in focus. Examples include data items that may be labeled DataItem, GridItemPattern in a grid control and labeled DataGrid, GridPattern, e.g., the adjacent cells in a spreadsheet worksheet. Other examples include data items that are labeled DataItem, TableItemPattern in a table control that may be labeled Table, TablePattern, e.g., the adjacent cells in a table in a document. Other examples could use a GridPattern.GetItem API. Similar to the methodology for the tab order navigation as described above, focusing a new UI element may require highlighting to distinguish it from the residual graphic showing the focus of the previous UI element.

Figure 22:
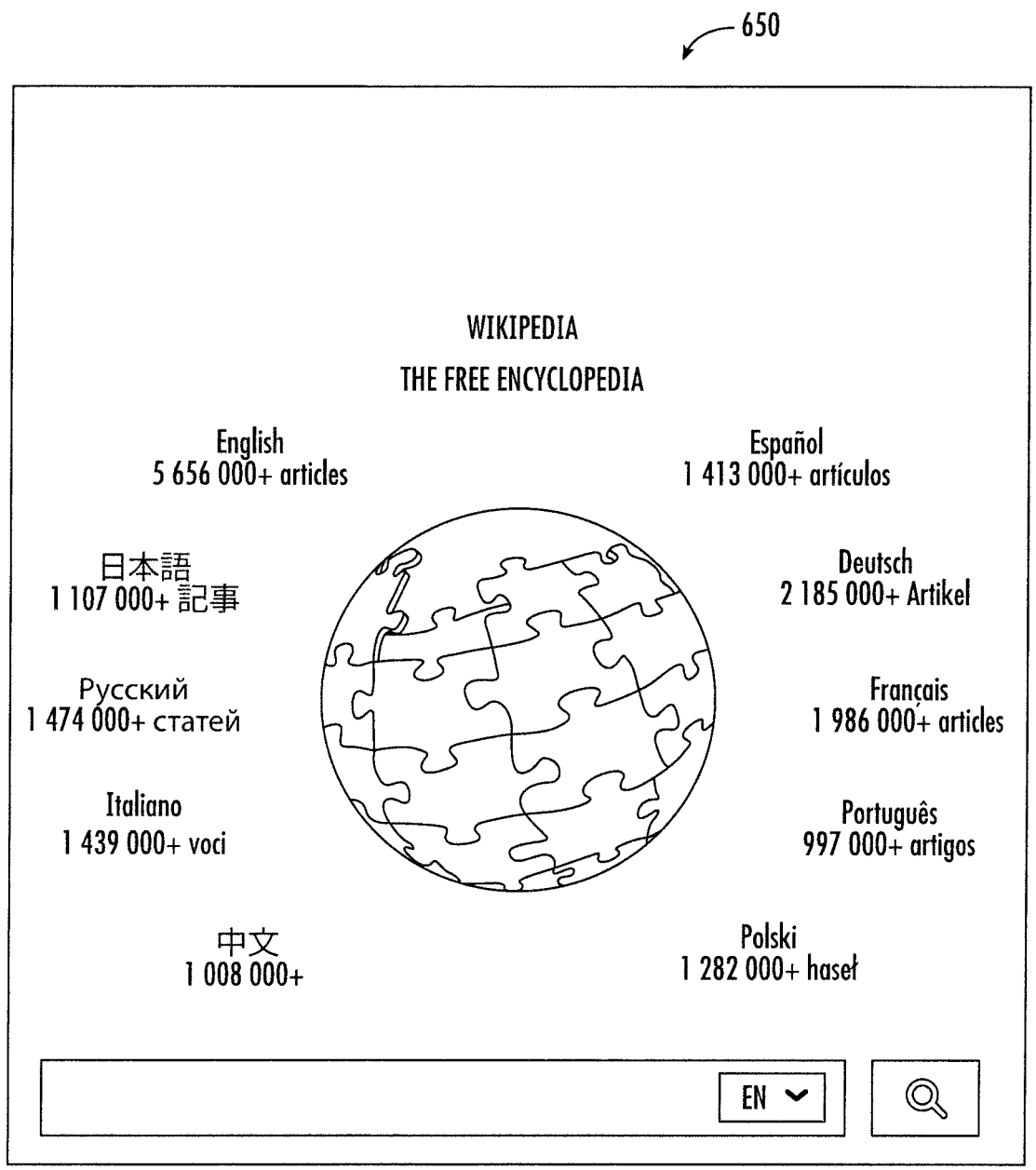
FIG. 22 is an example screenshot of a combo box in a webpage that uses a picker control that can be cached and optimized for reduced latency navigation of UI elements.
Figure 23:
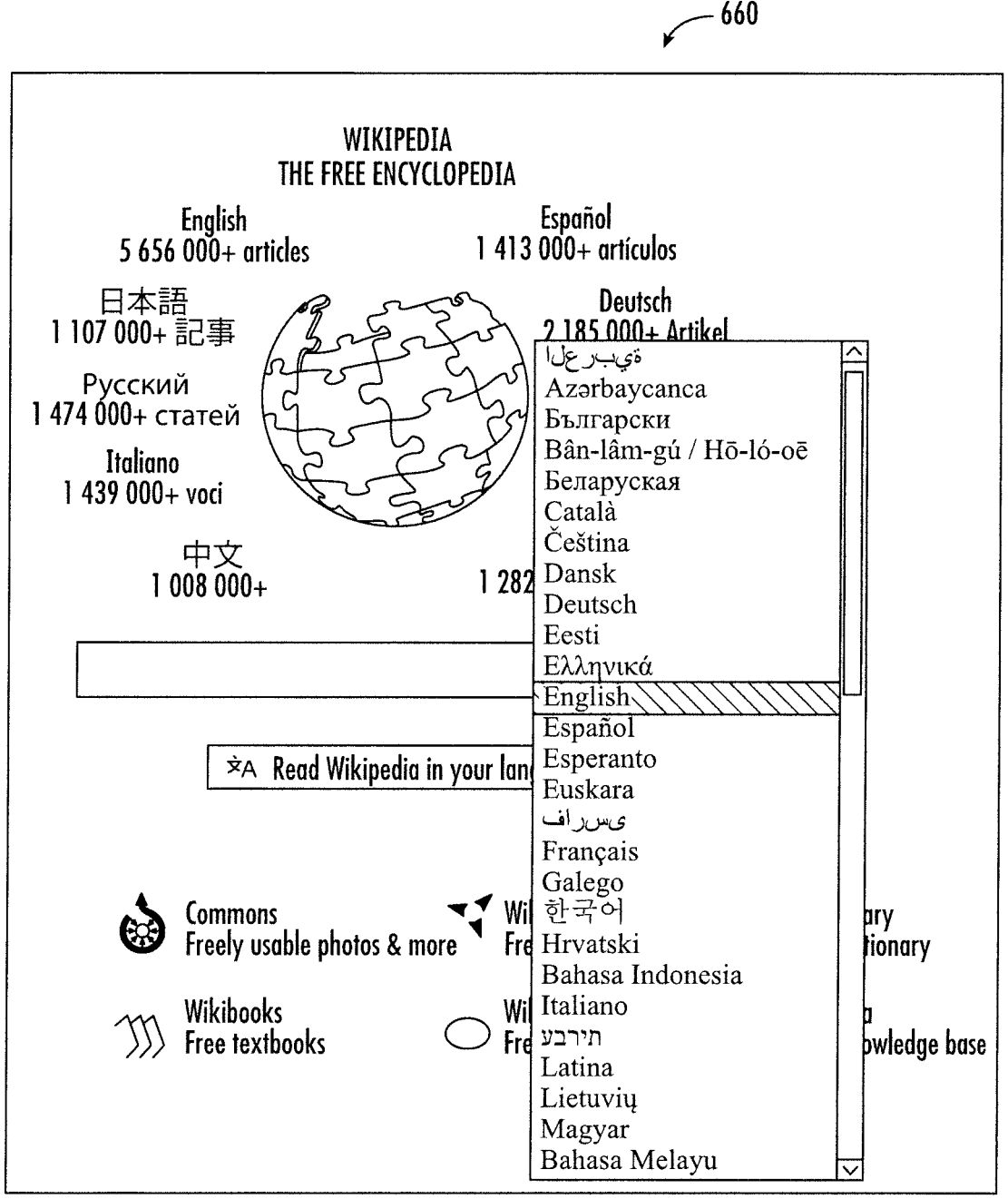
FIG. 23 shows the combo box of FIG. 22 with a combo box selection in the webpage.

It is also possible to conduct navigation in picker controls, referred to by some skilled in the art as a combo box, e.g., a list box, combined with a static control or edit control that displays the currently selected item in the list box portion of the combo box. The list box portion of the edit control may be displayed at all times or only appear when a user selects the drop-down arrow, which can be a push button, next to the edit control. For example, referring now to FIG. 22, there is illustrated an example screenshot as a combo box generally at 650 for a Wikipedia webpage as a non-limiting example, and at FIG. 23, the screenshot as a combo box is selected in the webpage and shown generally at 660.

As an example, the client computing device 410 may receive from the virtualization server 414 metadata associated with a combo box. Upon receiving user input in the area of a drop-down arrow, the client computing device 410 may immediately display the complete list items (ListItem) in the local virtual UI element overlay. Upon receiving user selection of one of the list items, the client computing device 410 may immediately display the selection in a local static/edit control and asynchronously hide the local list box in the local virtual UI element overlay.

It is also possible to apply the reduced latency navigation UI elements as described for opening, closing menus and jump lists using similar techniques as described. Similar to the parameters described relative to the navigation and picker controls described above, metadata associated with menus containing a collection of menu items as UI elements and metadata associated with different jump lists such as a taskbar, also known as destination lists, could be cached at the client computing device 410 to provide immediate local feedback. It is also possible to change the state of toggle controls such as check boxes or groups of radio buttons that could be optimized with immediate local feedback in a similar fashion. For example, an application may use radio buttons in a group box to permit the user to choose from a set of related, but mutually exclusive options. Therefore, similar to the technique for tab order navigation described above, the computing system may focus in a new UI element as a selected radio button that may need to be highlighted to distinguish it from the residual graphics showing the focus in the previous UI element.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. A computing system operable to run virtual machine sessions from a virtualization server and provide a hosted application, comprising:
    at least one client computing device configured to access the hosted application during one of the virtual machine sessions with the virtualization server and receive therefrom a hierarchical tree of user interface (UI) elements that include an ordered hierarchy of graphical control elements when sequenced therethrough and are enumerated at a top-level as a root element in a control view using a tag index of each control element, wherein the at least one client computing device is configured to perform the following:
        display some of the UI elements from the hierarchical tree locally as local virtual UI elements and based upon the received hierarchical tree, maintain the other UI elements hidden,
        apply user input as a tab or arrow key entry to one of the displayed UI elements as a graphical control element, and
        generate a local virtual UI element graphics overlay and display the local virtual UI element to which user input had been applied and one or more previously hidden UI elements as a graphical control element corresponding to a predicted response to the user input of the tab or arrow key entry;
        send the user input of the tab or arrow key entry to said virtualization server; and
        receive an updated UI element graphics from the virtualization server corresponding to an actual response to the user input of the tab or arrow key entry and replace at least a portion of the local virtual UI element graphics overlay with the received updated UI element graphics, and repeat the tab or arrow key entry for a next graphical control element in the ordered hierarchy of graphical control elements.

2. The computing system of claim 1 wherein said at least one client computing device comprises an input device, with the user input being based on at least one of a user selecting tab, button, menu, jump list, toggle and picker control via said input device.

3. The computing system of claim 1 wherein the next graphical control element in the ordered hierarchy after the graphical control element receiving the user input of the tab or arrow key entry is displayed as a highlighted rectangle on said at least one client computing device.

4. The computing system of claim 3 wherein the highlighting is based on at least one of a border and color.

5. The computing system of claim 1 wherein each graphical control element has data associated therewith, with the data being cached by said at least one client computing device.

6. The computing system of claim 5 wherein the caching by said at least one client computing device is performed when the corresponding graphical control element is in focus.

7. The computing system of claim 5 wherein the cached data includes at least one of encrypted text, list item, picker control item, menu item, jump list item, and start menu item.

8. The computing system of claim 1 wherein the local virtual UI element graphics overlay is deleted based on one or more of replacing said local virtual UI element graphics overlay with the received updated UI element graphics, hosted application process terminating, hosted application window closing, hosted application UI element getting out of focus, hosted application UI element becoming hidden, hosted application UI element being deleted, heuristics specific to receiving the hosted application UI element, and policies associated with displaying the received hosted application UI element.

9. The computing system of claim 1 wherein the local virtual UI element graphics overlay is generated based upon a determined latency by the virtualization server with the at least one client computing device as a latency standard deviation above predetermined levels or an average or median latency.

10. The computing system of claim 9 wherein the latency is based on at least one of an average, a median and a standard deviation of latencies between the virtualization server and said at least one client computing device.

11. The computing system of claim 1 wherein the at least one client computing device is configured to:
send the user input of the tab or arrow key entry to said virtualization server; and
receive an updated UI element graphics from the virtualization server corresponding to an actual response to the user input of the tab or arrow key entry and replace at least a portion of the local virtual UI element graphics overlay with the received updated UI element graphics, and repeat the tab or arrow key entry for a next graphical control element in the ordered hierarchy of graphical control elements.

12. The computing system of claim 11 wherein the replacement of the local virtual UI element graphics overlay with the received updated UI element graphics is performed by hiding the said local virtual UI element graphics overlay and unveiling the received updated UI element graphics underneath the local virtual UI element graphics overlay.

13. A method for operating virtual machine sessions provided by a virtualization server in communication with at least one client computing device of a computing system to provide a hosted application that includes user interface (UI) elements comprising an ordered hierarchy of graphical control elements when sequenced therethrough, wherein the virtualization server is configured to enumerate UI elements at a top-level as a root element in a control view where the relative tab order of enumerated controls are retrieved using a tag index of each control element in an enumerated order, and insert the enumerated control element and tab order in a hierarchical tree, the method comprising:
accessing the hosted application from at least one client computing device during one of the virtual machine sessions for receiving the hierarchical tree of the UI elements as an ordered hierarchy of graphical control elements, the client computing device operable to perform the following:
displaying some of the UI elements from the hierarchical tree locally as local virtual UI elements and based upon the received hierarchical tree, maintaining the other UI elements hidden,
applying user input as a tab or arrow key entry to one of the displayed UI elements as a graphical control element, and
generating a local virtual UI element graphics overlay and displaying the local virtual UI element to which user input had been applied and one or more previously hidden UI elements as graphical control elements corresponding to a predicted response to the user input of the tab or arrow key entry;
sending the user input of the tab or arrow key entry to the virtualization server, and
receiving updated UI element graphics from the virtualization server corresponding to an actual response to the user input, and replacing at least a portion of the local virtual UI element graphics overlay with the received updated UI element graphics, and repeating the tab or arrow key entry for the next graphical control element in the ordered hierarchy of graphical control elements.

14. The method of claim 13 wherein each graphical control element has data associated therewith, with the data being cached by the at least one client computing device.

15. The method of claim 14 wherein the caching by said at least one client computing device is performed when the corresponding graphical control element is in focus.

16. The method of claim 13 wherein the next graphical control element in the ordered hierarchy after the graphical control element receiving the user input of the tab or arrow key entry is displayed as a highlighted rectangle on said at least one client computing device.

17. The method of claim 13 wherein the local virtual UI element graphics overlay is deleted based on one or more of replacing the said local virtual UI element graphics overlay with the received updated UI element graphics, hosted application process terminating, hosted application window closing, hosted application UI element getting out of focus, hosted application UI element becoming hidden, hosted application UI element being deleted, heuristics specific to receiving the hosted application UI element, and policies associated with displaying the received hosted application UI element.

18. The method of claim 13 wherein the local virtual UI element graphics overlay are generated based upon a determined latency by the virtualization server with the at least one client computing device as a latency standard deviation above predetermined levels or an average or median latency.

19. The method of claim 13 wherein the client computing device is operable for:
sending the user input of the tab or arrow key entry to the virtualization server, and receiving updated UI element graphics from the virtualization server corresponding to an actual response to the user input, and replacing at least a portion of the local virtual UI element graphics overlay with the received updated UI element graphics, and repeating the tab or arrow key entry for the next graphical control element in the ordered hierarchy of graphical control elements.

20. A non-transitory computer readable medium for operating virtual machine sessions provided by a virtualization server in communication with at least one client computing device and providing a hosted application that includes user interface (UI) elements comprising an ordered hierarchy of graphical control elements when sequenced therethrough, wherein the virtualization server is configured to enumerate UI elements at a top-level as a root element in a control view where the relative tab order of enumerated controls are retrieved using a tag index of each control element in an enumerated order, and insert the enumerated control element and tab order in a hierarchical tree, and with the non-transitory computer readable medium having a plurality of computer executable instructions for causing the at least one client computing device to perform steps comprising:

accessing the host application during one of the virtual machine sessions for receiving the hierarchical tree of the UI elements as an ordered hierarchy of graphical control elements, displaying some of the UI elements from the hierarchical tree locally as local virtual UI elements and based upon the received hierarchical tree, maintaining the other UI elements hidden, applying user input as a tab or arrow key entry to one of the displayed UI elements as a graphical control element, and generating a local virtual UI element graphics overlay and displaying the local virtual UI element to which user input had been applied and one or more previously hidden UI elements as graphical control elements corresponding to a predicted response;

sending the user input to the virtualization server, and receiving updated UI element graphics from the virtualization server corresponding to an actual response to the user input, and replacing at least a portion of the local virtual UI element graphics overlay with the received updated UI element graphics, and repeating the tab or arrow key entry for the next graphical control element in the ordered hierarchy of graphical control elements.

\* \* \* \* \*